(12) United States Patent
Inoue et al.

(10) Patent No.: US 10,971,737 B2
(45) Date of Patent: Apr. 6, 2021

(54) FUEL CELL STACK, FUEL CELL STACK DUMMY CELL, METHOD OF PRODUCING DUMMY CELL

(71) Applicant: HONDA MOTOR CO., LTD., Tokyo (JP)

(72) Inventors: Daisuke Inoue, Wako (JP); Satoshi Aoki, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/351,614

(22) Filed: Mar. 13, 2019

(65) Prior Publication Data

US 2019/0288301 A1  Sep. 19, 2019

(30) Foreign Application Priority Data

Mar. 15, 2018  (JP) .............................. JP2018-047532
Mar. 15, 2018  (JP) .............................. JP2018-047748
May 18, 2018  (JP) .............................. JP2018-096340
Jun. 8, 2018  (JP) .............................. JP2018-110182

(51) Int. Cl.
*H01M 8/0263* (2016.01)
*H01M 8/023* (2016.01)
*H01M 8/12* (2016.01)
*H01M 8/2457* (2016.01)
*H01M 8/0271* (2016.01)
(Continued)

(52) U.S. Cl.
CPC ......... *H01M 8/0263* (2013.01); *H01M 8/023* (2013.01); *H01M 8/0271* (2013.01); *H01M 8/12* (2013.01); *H01M 8/241* (2013.01); *H01M 8/2457* (2016.02); *H01M 2008/1095* (2013.01)

(58) Field of Classification Search
CPC ....... H01M 8/0263; H01M 2008/1095; H01M 8/2457; H01M 8/0271; H01M 8/023
See application file for complete search history.

(56) References Cited

U.S. PATENT DOCUMENTS

2004/0265667 A1* 12/2004 Kato ................... H01M 8/0267
429/434
2006/0110649 A1  5/2006 Nishiyama et al.
(Continued)

FOREIGN PATENT DOCUMENTS

| DE | 102014210358 | 4/2015 |
|---|---|---|
| DE | 112014004462 | 6/2016 |
| JP | 4727972 | 7/2011 |

OTHER PUBLICATIONS

German Search Report for German Patent Application No. 102019203401.2 dated Jan. 7, 2020.

*Primary Examiner* — Olatunji A Godo
(74) *Attorney, Agent, or Firm* — Amin, Turocy & Watson, LLP

(57) ABSTRACT

A fuel cell stack at least includes a stack body formed by stacking a plurality of power generation cells in a stacking direction and a first dummy cell provided at one end of the stack body in the stacking direction. The power generation cell includes a membrane electrode assembly. The first dummy cell includes a dummy assembly formed by stacking together three electrically conductive porous bodies each having a different surface size, a dummy resin frame member formed around the dummy assembly, and dummy separators.

21 Claims, 14 Drawing Sheets

(51) Int. Cl.
*H01M 8/241* (2016.01)
*H01M 8/1018* (2016.01)

(56) References Cited

U.S. PATENT DOCUMENTS

| | | |
|---|---|---|
| 2006/0110650 A1 | 5/2006 | Sugiura et al. |
| 2013/0164646 A1* | 6/2013 | Kobayashi ............ H01M 8/241 |
| | | 429/434 |
| 2015/0118587 A1 | 4/2015 | Heo et al. |
| 2016/0211543 A1 | 7/2016 | Okabe et al. |

* cited by examiner

FUEL CELL STACK, FUEL CELL STACK DUMMY CELL, METHOD OF PRODUCING DUMMY CELL

CROSS-REFERENCE TO RELATED APPLICATIONS

This application is based upon and claims the benefit of priority from Japanese Patent Applications No. 2018-047748 filed on Mar. 15, 2018, No. 2018-047532 filed on Mar. 15, 2018, No. 2018-096340 filed on May 18, 2018, and No. 2018-110182 filed on Jun. 8, 2018, the contents all of which are incorporated herein by reference.

BACKGROUND OF THE INVENTION

Field of the Invention

The present invention relates to a fuel cell stack including a stack body and a dummy cell. The stack body is formed by stacking a plurality of power generation cells together in a stacking direction. Each of the power generation cells includes a membrane electrode assembly, a resin frame member provided around the membrane electrode assembly, and separators. The dummy cell is provided at least at one end of the stack body in the stacking direction. Further, the present invention relates to a fuel cell stack dummy cell, and a method of producing the dummy cell.

Description of the Related Art

In general, a solid polymer electrolyte fuel cell employs a solid polymer electrolyte membrane (hereinafter simply referred to as the electrolyte membrane). The solid polymer electrolyte membrane is a polymer ion exchange membrane. The fuel cell includes a membrane electrode assembly (MEA) including an anode provided on one surface of the electrolyte membrane, and a cathode provided on the other surface of the electrolyte membrane.

The membrane electrode assembly is sandwiched between separators to form a power generation cell, and a plurality of the power generation cells are stacked together to from a stack body. Power collecting terminals for collecting electric charges generated by power generation in each of the power generation cells, and end plates for holding the power generation cells in the stacked state are provided at both ends of the stack body in the stacking direction to form the fuel cell stack.

Since heat dissipation from ends of the stack body in the stacking direction (hereinafter also simply referred to as the end(s) or the end side(s)) is facilitated through terminal plates, etc., the end sides of the stack body in the stacking direction tend to have low temperature in comparison with the central side of the stack body in the stacking direction. When the temperature of the end sides of the stack body becomes low due to influence of the external temperature, etc., and water condensation occurs, there is a concern that the fuel gas and the oxygen-containing gas (reactant gases) are not diffused smoothly, and the desired power generation stability of the fuel cell stack may not be achieved.

In an attempt to address the problem, for example, in a fuel cell stack disclosed in Japanese Patent No. 4,727,972, so called dummy cells are provided at least at one end of the stack body in the stacking direction. In the dummy cells, since metal plates are used instead of electrolyte membranes, power generation is not performed, and water is not produced. Therefore, the dummy cells themselves function as heat insulating layers between the terminal plates and the stack body. Thus, by providing the dummy cells as described above, it is possible to suppress decrease in the temperature at the end of the stack body. That is, it is possible to reduce the influence of the external temperature on the fuel cell stack, and improve the power generation stability.

SUMMARY OF THE INVENTION

A main object of the present invention is to provide a fuel cell stack which makes it possible to improve the power generation stability.

Another object of the present invention is to provide a fuel cell stack dummy cell which makes it possible to improve the power generation stability.

Still another object of the present invention is to provide a method of producing a dummy cell which makes it possible to improve the power generation stability.

According to an aspect of the present invention, a fuel cell stack including a stack body and a dummy cell is provided. The stack body includes a plurality of power generation cells stacked together in a stacking direction together. Each of the power generation cells includes a membrane electrode assembly, a resin frame member provided around the membrane electrode assembly, and separators sandwiching the membrane electrode assembly. The membrane electrode assembly includes an electrolyte membrane and electrodes provided on both sides of the electrolyte membrane. The electrodes each have a gas diffusion layer of electrically conductive porous body. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly is formed by stacking together three electrically conductive porous bodies each having a different surface size.

In the fuel cell stack, the dummy assembly of the dummy cell is formed by stacking three electrically conductive porous bodies together. Unlike the dummy cell according to the comparative example using a metal plate instead of the electrolyte membrane of the membrane electrode assembly, the dummy assembly having such structure can be obtained at low cost since there is no need to provide members made of a plurality of materials such as the electrically conductive porous body and the metal plate. Further, since the dummy assembly is made of the electrically conductive porous body, and the gas diffusion layer of the membrane electrode assembly is made of electrically conductive porous body as well, it is possible to reduce the burden of providing constituent elements dedicated to the dummy cell.

Further, the dummy assembly is formed by stacking the three electrically conductive porous bodies having different surface sizes to provide steps for joining the dummy resin frame member in its outer marginal portion of the dummy assembly. Therefore, for example, without requiring a special production process of providing a step in an outer marginal portion of the electrically conductive porous body which is formed integrally in one piece, it is possible to obtain the dummy assembly relatively easily.

By providing the above dummy assembly, it is possible to provide each of the dummy cells having simple and economical structure.

Since the dummy cell includes the dummy assembly corresponding to the membrane electrode assembly, and does not include the membrane electrode assembly, power generation is not performed, and thus, no water is produced as a result of power generation. Therefore, the dummy cell itself functions as a heat insulating layer, and it is possible to suppress water condensation and/or freezing in the dummy cell. By providing the dummy cell at least at one end of the stack body in the stacking direction, it is possible to improve the heat insulating performance at the end of the stack body. Therefore, even in the environment at low temperature, it is possible to suppress decrease in the temperature at the end of the stack body in comparison with the central position of the stack body.

Further, since it is possible to improve the heat insulating performance at the end of the stack body, even in the case of starting operation of the fuel cell stack in the environment below the freezing temperature, it is possible to effectively increase the temperature of the entire stack body. Therefore, it is possible to suppress decrease in the voltage due to freezing of the produced water, etc. at the end of the stack body.

Thus, in the fuel cell stack, by the dummy cell having simple and economical structure, it is possible to suppress influence of the external air temperature on the fuel cell stack, and improve the power generation stability.

In the above fuel cell stack, preferably, each of the power generation cells and the dummy separators has an oxygen-containing gas passage configured to allow an oxygen-containing gas to flow in the stacking direction of the stack body and a fuel gas passage configured to allow a fuel gas to flow in the stacking direction of the stack body, and one separator of the separators that faces one of the electrodes of the membrane electrode assembly has an oxygen-containing gas flow field along which the oxygen-containing gas flows, another separator of the separators that faces another of the electrodes of the membrane electrode assembly has a fuel gas flow field along which the fuel gas flows, first space corresponding to the oxygen-containing gas flow field is formed between one dummy separator of the dummy separators that faces one end side of the dummy assembly in the stacking direction and the one end side of the dummy assembly, and second space corresponding to the fuel gas flow field is formed between another dummy separator of the dummy separators that faces another end side of the dummy assembly in the stacking direction and the other end side of the dummy assembly, and a connection channel configured to permit flow of the oxygen-containing gas is provided between the oxygen-containing gas passage and the first space, and a blocking part configured to block flow of the fuel gas is provided between the fuel gas passage and the second space.

The oxygen-containing gas in the humidified state is supplied to the inlet side the oxygen-containing gas passage of the fuel cell stack. The water vapor in the oxygen-containing gas is condensed to produce condensed water in the liquid state, and the condensed water is splashed into the power generation cells, diffusion performance of the fuel gas and the oxygen-containing gas (reactant gases) may be lowered undesirably.

In the fuel cell stack, since the oxygen-containing gas passage and the first space adjacent to the dummy assembly at one end in the stacking direction are connected through the connection channel, the oxygen-containing gas flows through the first space. Therefore, even if the oxygen-containing gas contains the condensed water, the condensed water is collected by the dummy cell, and it is possible to prevent the condensed water from being splashed into the power generation cells.

Further, in the dummy cell of the fuel cell stack, since the blocking part is provided as described above, the fuel gas flowing through the fuel gas passage does not flow through the second space adjacent to one end of the dummy assembly in the stacking direction. Since the fuel gas does not flow through the second space, the heat insulating performance in the second space is increased, and the second space functions as heat insulating space. Accordingly, it is possible to improve the heat insulating performance by the dummy cell to a greater extent. Further, it is possible to reduce the quantity of the fuel gas which is discharged from the fuel cell stack without contributing to electrochemical reactions for power generation.

Therefore, by providing the connection channel and the blocking part as described above, it is becomes possible to improve the power generation stability of the fuel cell stack to a greater extent.

In the fuel cell stack, preferably, the dummy resin frame member has the same structure as the resin frame member. In this case, the same structure can be adopted for the dummy resin frame member and the resin frame member of the power generation cell. Accordingly, the dummy cell can have more simple and economical structure.

In the fuel cell stack, preferably, the three electrically conductive porous bodies are made of the same material. In the dummy cell, the dummy assembly is formed by stacking the electrically conductive porous bodies made of the same material together. Therefore, for example, unlike the dummy cell according to the comparative example where members of different materials are stacked together, e.g., the metal plate is held by the electrically conductive porous body, it is possible to reduce the contact resistance. In the structure, since it is possible to reduce the internal resistance of the fuel cell stack, it is possible to improve the power generation efficiency.

In the fuel cell stack, a joint part configured to join the dummy assembly and the dummy resin frame member together is formed discontinuously in a peripheral direction of the dummy assembly. Unlike the power generation cell where the outer portions of the resin frame member and the membrane electrode assembly are joined together tightly to suppress cross leakage, etc., in the dummy cell which does not perform power generation, there is no need to suppress cross leakage. Therefore, by forming the joint part where the dummy assembly and the dummy resin frame member are joined together discontinuously, it becomes possible to simplify the step of joining the dummy assembly and the dummy resin frame member, and improve the production efficiency of the fuel cell stack.

In the fuel cell stack, preferably, the dummy assembly is formed by stacking the three electrically conductive porous bodies including a first electrically conductive porous body, a second electrically conductive porous body having a surface size larger than that of the first electrically conductive porous body, and a third electrically conductive porous body having a surface size larger than that of the second electrically conductive porous body, and the surface size of the third electrically conductive porous body is larger than the surface size of the gas diffusion layer.

As described above, in the dummy assembly of the dummy cell which does not perform power generation, there is no need to adopt dimensional tolerance as in the case of the membrane electrode assembly of the power generation cell which performs power generation. Further, the dummy resin frame member provided at the outer end of the dummy assembly has the same structure as the resin frame member provided on the outer end of the membrane electrode assembly. Therefore, by making the surface size of the third electrically conductive porous body larger than the surface size of the gas diffusion layer, it is possible to make the joining area between the dummy assembly and the dummy resin frame member larger than the joining area between the membrane electrode assembly and the resin frame member.

In this manner, it is possible to improve the joining strength of the dummy resin frame member and the dummy assembly. As a result, it is possible to reliably join the resin frame member and the dummy assembly without causing rattling to obtain the dummy cell.

In the above structure, in the fuel cell stack, it is possible to obtain the dummy cell having high quality at a high yield rate. Further, it is possible to improve the power generation stability.

In the fuel cell stack, preferably, the second electrically conductive porous body is provided at the center of the dummy assembly in the stacking direction, the dummy resin frame member includes a contact surface configured to contact an outer exposed portion of the second electrically conductive porous body extending outward beyond an outer end surface of the first electrically conductive porous body and a joint surface joined to an outer exposed portion of the third electrically conductive porous body extending outward beyond an outer end surface of the second electrically conductive porous body through a joint part, and the joint part is formed discontinuously in a peripheral direction of the outer exposed portion of the third electrically conductive porous body.

Unlike the power generation cell where the outer portions of the resin frame member and the membrane electrode assembly are joined together in an air-tight manner to suppress cross leakage, etc., in the dummy cell which does not perform power generation, there is no need to suppress cross leakage. Therefore, by forming the joint part where the dummy assembly and the dummy resin frame member are joined together discontinuously, it becomes possible to simplify the step of joining the dummy assembly and the dummy resin frame member, and improve the production efficiency of the fuel cell stack.

In the fuel cell stack, preferably, the joint part includes an impregnation portion where the outer exposed portion of the third electrically conductive porous body is impregnated with part of the melted dummy resin frame member. In this case, since part of the dummy resin frame member is impregnated into the third electrically conductive porous body, for example, unlike the dummy resin frame member and the dummy assembly that are joined together using adhesive only between the dummy resin frame member and the dummy assembly, it is possible to improve the joining strength of the dummy resin frame member and the dummy assembly.

In the fuel cell stack, part of the dummy resin frame member is a resin projection provided on an outer side beyond the joint surface of the dummy resin frame member in a manner that the resin projection protrudes in a thickness direction of the resin frame member. In this case, with the simple structure, it is possible to form the joint part easily and suitably. Thus, it becomes possible to obtain each of the dummy cells more efficiently. Moreover, it is possible improve the power generation efficiency of the fuel cell stack.

In the fuel cell stack, preferably, water repellent treatment is applied to one of the three electrically conductive porous bodies. In this case, it is possible suppress stagnation of the liquid water such as the condensed water and/or the produced water inside the dummy cell. Therefore, even in the environment at low temperature, it is possible to avoid freezing of the dummy cell.

In the fuel cell stack, preferably, the dummy assembly is formed by stacking the three electrically conductive porous bodies including a first electrically conductive porous body, a second electrically conductive porous body stacked on the first electrically conductive porous body, and a third electrically conductive porous body stacked on the second electrically conductive porous body, water repellent treatment is applied to one of the second electrically conductive porous body and the third electrically conductive porous body, each of the separators and the dummy separators has an oxygen-containing gas passage configured to allow an oxygen-containing gas to flow in the stacking direction of the stack body and a fuel gas passage configured to allow a fuel gas to flow in the stacking direction of the stack body, the separator that faces one of the electrodes of the membrane electrode assembly has an oxygen-containing gas flow field along which the oxygen-containing gas flows, the separator that faces another of the electrodes of the membrane electrode assembly has a fuel gas flow field along which the fuel gas flows, first space corresponding to the oxygen-containing gas flow field is formed between the dummy separator and the first electrically conductive porous body, second space corresponding to the fuel gas flow field is formed between the dummy separator and the third electrically conductive porous body, and a connection channel configured to permit flow of the oxygen-containing gas is provided between the oxygen-containing gas passage and the first space, and a blocking part configured to block flow of the fuel gas is provided between the fuel gas passage and the second space.

In this case, since the fuel gas does not flow through the second space, the heat insulating performance in the second space is increased, and the second space functions as heat insulating space. Accordingly, it is possible to improve the heat insulating performance by the dummy cell to a greater extent. Further, it is possible to reduce the quantity of the fuel gas which is discharged from the fuel cell stack without contributing to electrochemical reactions for power generation.

Further, the condensed water, etc. in the liquid state collected by each of the dummy cells is discharged smoothly from each of the dummy cells, during high load power generation of the fuel cell stack, or when power generation of the fuel cell stack is stopped and the flow rate of the oxygen-containing gas flowing through the first space is increased by the drying process, or when each of the dummy cells is dried.

In the dummy assembly, the water repellent treatment is applied to the third electrically conductive porous body adjacent to the second space or the second electrically conductive porous body adjacent to the third electrically conductive porous body. Therefore, in the dummy cell, it is possible to prevent entry of liquid water from the first space from being flowing into the second space where the flow of the fuel gas is blocked as described above.

As a result, by the oxygen-containing gas flowing through the first space, it becomes possible to discharge the liquid water in each of the dummy cells more suitably. Accordingly, it is possible to suppress stagnation of the liquid water in each of the dummy cells. Therefore, it is possible to avoid freezing of the dummy cell effectively, and achieve further improvement in the power generation stability of the fuel cell stack.

In the fuel cell stack, preferably, a joint part configured to join the dummy assembly and the dummy resin frame member together is formed discontinuously in a peripheral direction of the electrically conductive porous body having the largest surface size, among the three electrically conductive porous bodies. In this case, it becomes possible to simplify the step of joining the dummy assembly and the dummy resin frame member, and improve the production efficiency of the fuel cell stack.

In the fuel cell stack, preferably, each of the separators and the dummy separators has an oxygen-containing gas passage configured to allow an oxygen-containing gas to flow in the stacking direction of the stack body and a fuel gas passage configured to allow a fuel gas to flow in the stacking direction of the stack body, and one separator of the separators that faces one of the electrodes of the membrane electrode assembly has an oxygen-containing gas flow field along which the oxygen-containing gas flows, another separator of the separators that faces another of the electrodes of the membrane electrode assembly has a fuel gas flow field along which the fuel gas flows, first space corresponding to the oxygen-containing gas flow field is formed between one dummy separator of the dummy separators that faces one end side of the dummy assembly in the stacking direction and the one end side of the dummy assembly, and second space corresponding to the fuel gas flow field is formed between another dummy separator of the dummy separators that faces another end side of the dummy assembly in the stacking direction and the other end of the dummy assembly, and a connection channel configured to permit flow of the oxygen-containing gas is provided between the oxygen-containing gas passage and the first space, and the dummy assembly has a through hole connecting the first space and the second space at a lower position in the vertical direction.

In the fuel cell stack, the oxygen-containing gas passage and the first space adjacent to one end of the dummy assembly in the stacking direction are connected together by the connection channel. In the structure, since the oxygen-containing gas flows through the first space, even if the oxygen-containing gas contains the condensed water, the condensed water is collected by the dummy cell, and it is possible to prevent the condensed water from being splashed into the power generation cells.

Further, since the through hole is provided in the dummy assembly to connect the first space and the second space at the lower position in the vertical direction, even in the case where the liquid water enters the second space, the liquid water moves toward the through hole by the gravity, and the liquid water is guided toward the first space through the through hole.

As a result, by the oxygen-containing gas flowing through the first space, it becomes possible to facilitate water discharging from the dummy cells more suitably, and it is possible suppress stagnation of the liquid water inside the dummy cell. Therefore, even in the environment at low temperature, it is possible to avoid freezing of the dummy cell. As described above, in the fuel cell stack, it is possible to improve the power generation stability by the dummy cell where freezing is suppressed.

In the fuel cell stack, preferably, the through hole of the dummy assembly is provided adjacent to the oxygen-containing gas passage on an outlet side of the oxygen-containing gas which flows through the first space. In the structure, it is possible to effectively discharge the liquid water guided from the second space to the first space through the through hole to the outside of the dummy cell (oxygen-containing gas passage on the outlet side).

In the fuel cell stack, preferably, the separators and the dummy separators have a rectangular shape and the longitudinal direction of the rectangular shape is oriented in a horizontal direction, the oxygen-containing gas passage on an inlet side configured to supply the oxygen-containing gas to the oxygen-containing gas flow field and the first space is provided at an upper position in the vertical direction of the separators and the dummy separators, and the oxygen-containing gas passage on an outlet side configured to discharge the oxygen-containing gas from the oxygen-containing gas flow field and the first space is provided at a lower position in the vertical direction of the separators and the dummy separators. In the structure, by effectively guiding the liquid water in the dummy cell to the oxygen-containing gas passage on the outlet side by the gravity, it becomes possible to suitably discharge water.

In the fuel cell stack, preferably, the first space is configured to allow the oxygen-containing gas to flow in one direction oriented in the longitudinal direction of the dummy separators. In this case, it becomes possible to easily guide the liquid water in the dummy cell toward the oxygen-containing gas passage on the outlet side easily through the first space, for discharging the water.

In the fuel cell stack, preferably, the three electrically conductive porous bodies include a first electrically conductive porous body, a second electrically conductive porous body having a surface size larger than that of the first electrically conductive porous body, and a third electrically conductive porous body having a surface size larger than that of the second electrically conductive porous body, and the dummy resin frame member includes an outer marginal portion, a shelf protruding inward from an inner end of the outer marginal portion over the entire periphery through a first stepped surface, and a thin portion protruding inward from an inner end of the shelf over the entire periphery through a second stepped surface, an outer marginal portion of the third electrically conductive porous body is overlapped with the shelf of the dummy resin frame member, and an outer marginal portion of the second electrically conductive porous body is adjacent to the thin portion of the dummy resin frame member, and an outer end surface of the first electrically conductive porous body faces an inner end surface of the dummy resin frame member.

In the fuel cell stack, preferably, the thickness of the second electrically conductive porous body is larger than the height of the second stepped surface.

In the fuel cell stack, preferably, space is formed between the thin portion of the dummy resin frame member and the third electrically conductive porous body.

According to another aspect of the present invention, a dummy cell for a fuel cell stack is provided. The fuel cell stack includes a stack body and the dummy cell. The stack body includes a plurality of power generation cells stacked together in a stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes provided on both sides of the electrolyte membrane. The electrodes each have a gas diffusion layer of electrically conductive porous body. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly is formed by stacking three electrically conductive porous bodies each having a different surface size.

In the fuel cell stack dummy cell, with the simple structure having the dummy assembly formed by stacking three electrically conductive porous bodies, it is possible to suppress influence of the external air temperature on the fuel cell stack, and improve the power generation stability.

According to still another aspect of the present invention, a method of producing a dummy cell is provided. The dummy cell is provided at least at one end of a stack body of a fuel cell stack in a stacking direction. The fuel cell stack includes the stack body including a plurality of power generation cells stacked together in the stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes provided on both sides of the electrolyte membrane. The electrodes each have a gas diffusion layer of electrically conductive porous body. The method includes a water repellent treatment step of applying water repellent treatment to one of three electrically conductive porous bodies each having a different surface size, a first stacking step of stacking the three electrically conductive porous bodies together to form a dummy assembly corresponding to the membrane electrode assembly, a resin frame joining step of providing the dummy assembly with a dummy resin frame member extending around the dummy assembly to thereby obtain a resin frame equipped dummy assembly, and a second stacking step of sandwiching the resin frame equipped dummy assembly between dummy separators to obtain the dummy cell.

In the method of producing the dummy cell, water repellent treatment is applied to one of the three electrically conductive porous bodies of the dummy assembly. As a result, it is possible to obtain the dummy cell where stagnation of the liquid water such as the condensed water and the produced water is suppressed. In the dummy cell, since power generation is not performed, and thus, no water is produced. Therefore, the dummy cell functions as a heat insulating layer. In the fuel cell having the dummy cell provided at least at one end of the stack body in the stacking direction, since it is possible to improve the heat insulating performance at the end of the stack body, it is possible to improve the power generation stability. Therefore, even in the environment at low temperature, by the dummy cell where freezing is suppressed, it is possible to improve the power generation stability of the fuel cell stack.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
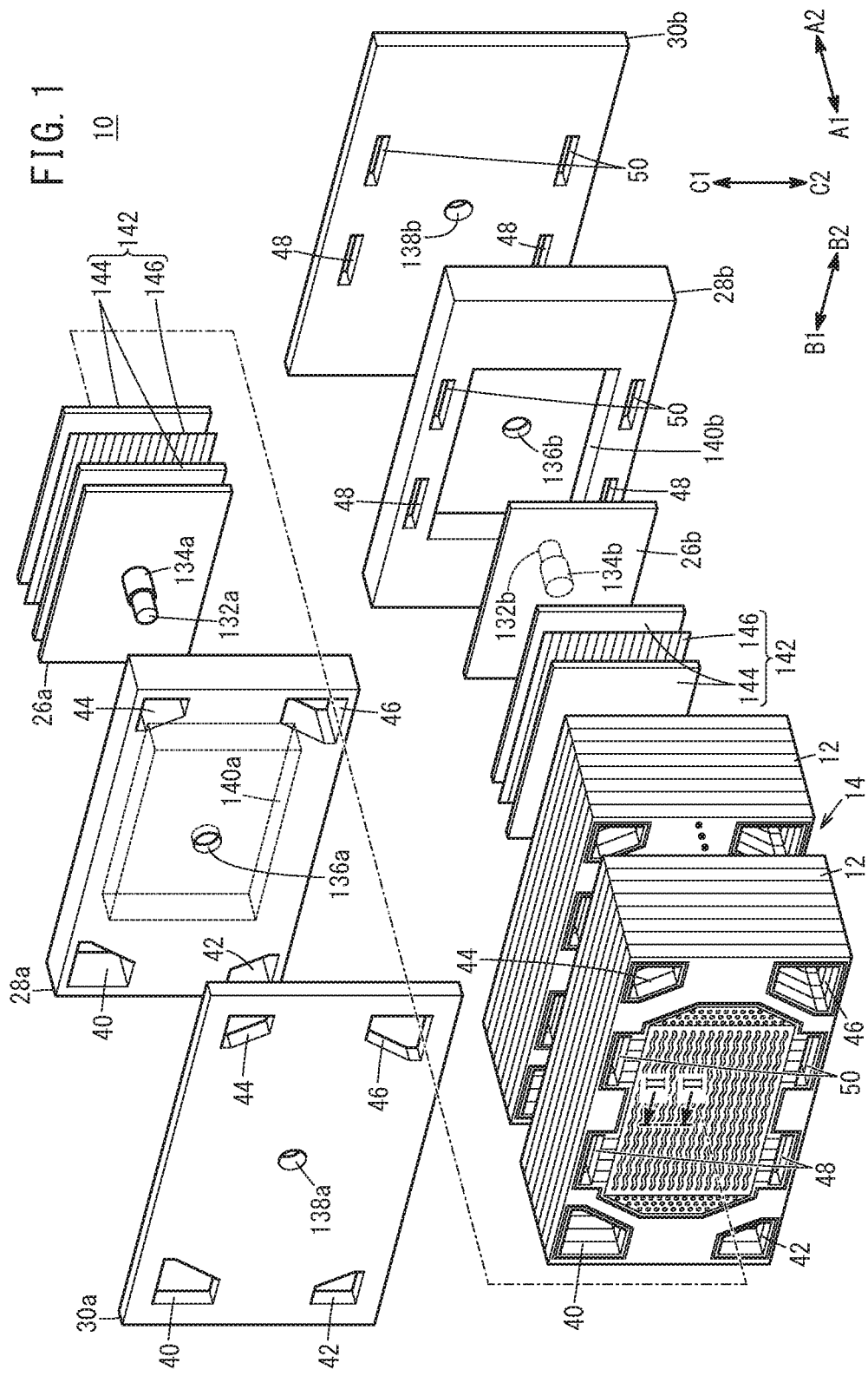
FIG. 1 is an exploded perspective view showing a fuel cell stack according to an embodiment of the present invention.

A preferred embodiment of a method of producing a fuel cell stack, a fuel cell stack dummy cell, a dummy cell according to the present invention will be described in detail with reference to the accompanying drawings. In the drawings, the constituent elements which have the same or similar functions and which offer the same or similar advantages are labeled with the same reference numerals, and description of such constituent elements will be omitted as necessary.

Figure 2:
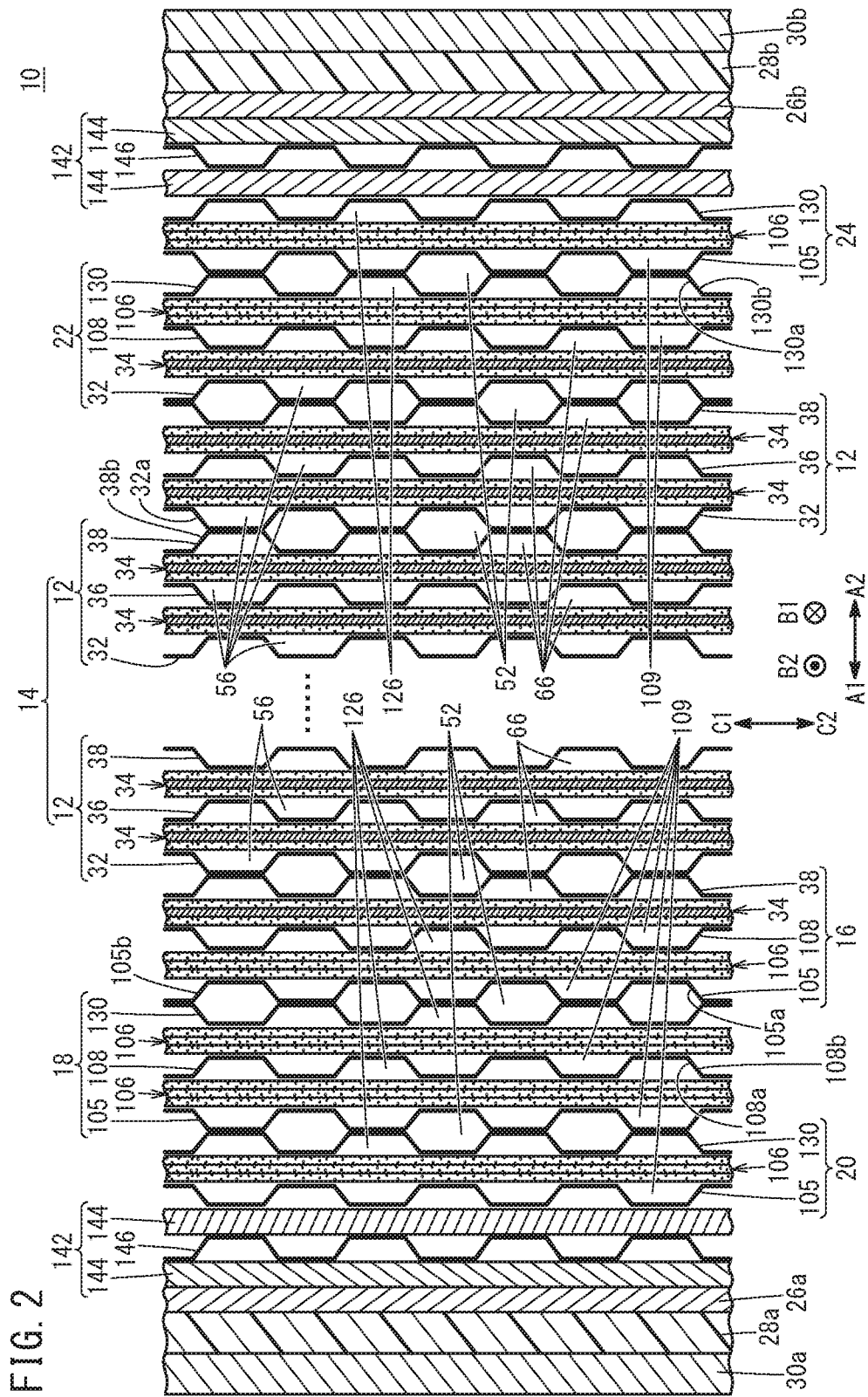
FIG. 2 is a cross sectional view of a fuel cell stack taken along a line II-II in FIG. 1.

As shown in FIGS. 1 and 2, the fuel cell stack 10 according to an embodiment of the present invention includes a stack body 14 formed by stacking a plurality of power generation cells 12 in a horizontal direction (indicated by arrows A1 and A2) or in the gravity direction (indicated by arrows C1 and C2). For example, the fuel cell stack 10 is mounted in a fuel cell vehicle such as a fuel cell electric automobile (not shown).

As shown in FIG. 2, at one end of the stack body 14 in a stacking direction of the stack body 14 (indicated by an arrow A1), a first end power generation unit 16 is provided. A first dummy cell 18 is provided outside the first end power generation unit 16, and a second dummy cell 20 is provided outside the first dummy cell 18. Further, at the other end of the stack body 14 in the stacking direction indicated by the arrow A2, a second end power generation unit 22 is provided. A third dummy cell 24 is provided outside the second end power generation unit 22. A terminal plate 26a is provided outside the second dummy cell 20 of the stack body 14 in the direction indicated by the arrow A1, and an insulator 28a is provided outside the terminal plate 26a, and an end plate 30a is provided outside the insulator 28a. A terminal plate 26b is provided outside the third dummy cell 24 of the stack body 14 in the direction indicated by an arrow A2. An insulator 28b is provided outside the terminal plate 26b, and an end plate 30b is provided outside the insulator 28b.

As shown in FIG. 1, coupling bars (not shown) are provided between sides of rectangular end plates 30a, 30b. Both ends of each of the coupling bars are fixed to inner surfaces of the end plates 30a, 30b using bolts (not shown) to apply a tightening load to a plurality of power generation cells 12 in the stacking direction indicated by arrows A1, A2. The fuel cell stack 10 may include a casing having the end plates 30a, 30b, and the stack body 14, etc. may be placed in the casing.

Figure 3:
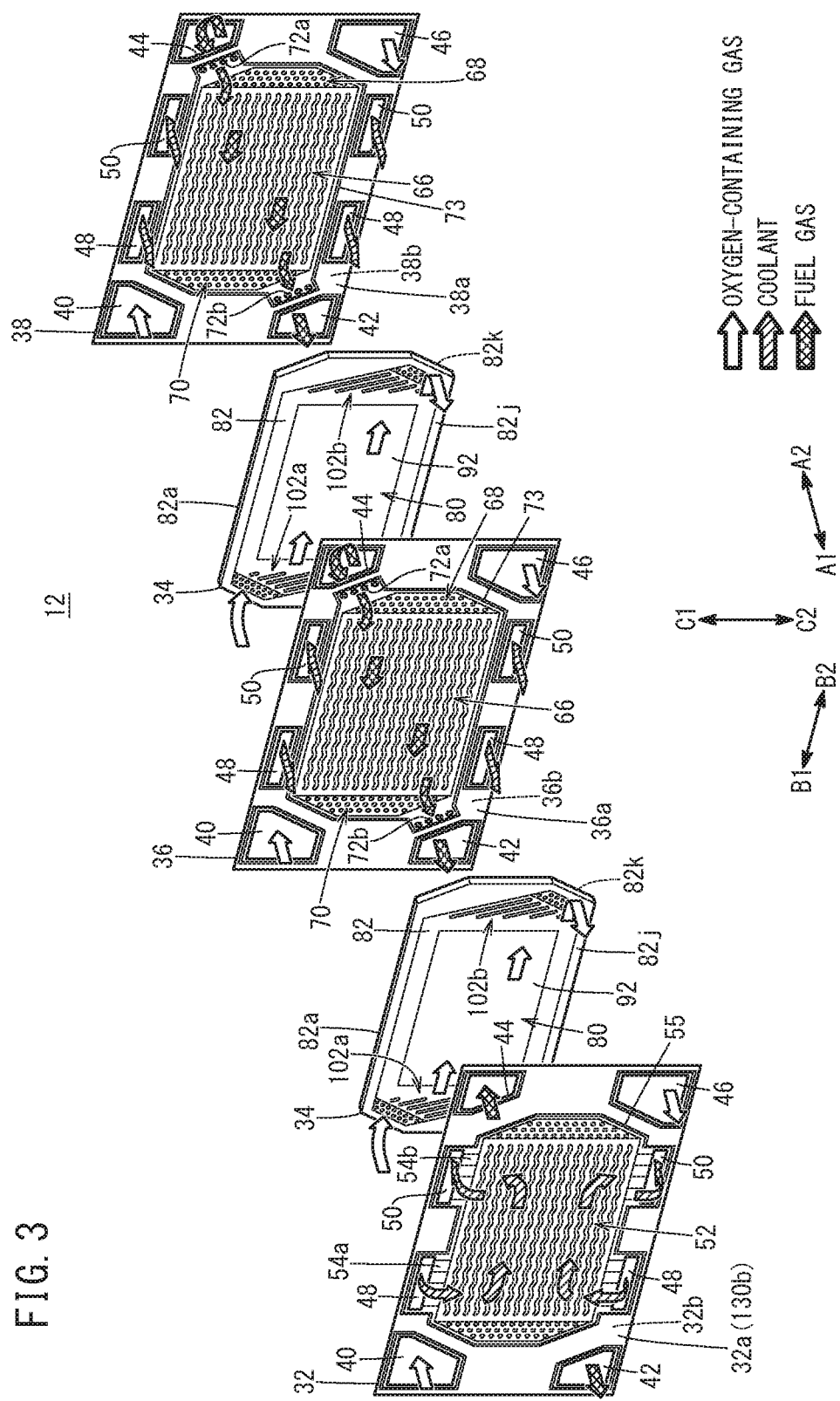
FIG. 3 is an exploded perspective view showing a power generation cell.

As shown in FIG. 3, the power generation cell 12 includes a first separator 32, a resin frame equipped MEA 34 stacked on the first separator 32, a second separator 36 stacked on the resin frame equipped MEA 34, a resin frame equipped MEA 34 stacked on the second separator 36, and a third separator 38 stacked on the resin frame equipped MEA 34. Each of the first separator 32, the second separator 36, and the third separator 38 (each of the separators) are in the form of a steel plate, a stainless steel plate, an aluminum plate, a plated steel plate, and formed by press forming, etc., to have a rectangular shape in a plan view and have a corrugated shape in cross section.

As shown in FIGS. 1 and 3, at one end of each separator in the longitudinal direction (long-side direction) (horizontal direction) indicated by an arrow B1, an oxygen-containing gas supply passage 40 (oxygen-containing gas passage) and a fuel gas discharge passage 42 (fuel gas passage) are provided. The oxygen-containing gas supply passage 40 and the fuel gas discharge passage 42 extend through each separator in the stacking direction indicated by the arrows A1 and A2, respectively. An oxygen-containing gas is supplied through the oxygen-containing gas supply passage 40. A fuel gas is discharged through the fuel gas discharge passage 42. These oxygen-containing gas and the fuel gas are also referred to as the reactant gases, collectively.

At the other end of each separator in the longitudinal direction (long-side direction) indicated by an arrow B2, a fuel gas supply passage 44 (fuel gas passage) for supplying the fuel gas and an oxygen-containing gas discharge passage 46 (oxygen-containing gas passage) for discharging the oxygen-containing gas (oxygen-containing gas passage) are provided. The fuel gas supply passage 44 and the oxygen-containing gas discharge passage 46 extend through each separator in the stacking direction indicated by the arrows A1, A2, respectively. The oxygen-containing gas supply passage 40, the fuel gas discharge passage 42, the fuel gas supply passage 44, and the oxygen-containing gas discharge passage 46 are also referred to as the reactant gas passage, collectively.

The oxygen-containing gas supply passage 40 and the fuel gas supply passage 44 are provided at upper positions of each separator in the vertical direction indicated by an arrow C1, and the fuel gas discharge passage 42 and the oxygen-containing gas discharge passage 46 are provided at lower positions of each separator in the vertical direction indicated by an arrow C2. The vertical direction herein is the vertical direction during operation of the fuel cell stack 10.

At both ends in the lateral direction (short-side direction) of each separator (vertical direction indicated by the arrows C1, C2), a pair of coolant supply passages 48 for supplying a coolant are provided on the side indicated by the arrow B1. The coolant supply passages 48 extend through each separator in the direction indicated by arrows A1, A2. At both ends in the lateral direction (short-side direction) of each separator, a pair of coolant discharge passages 50 for discharging the coolant are provided on the side indicated by the arrow B2. The coolant discharge passages 50 extend through each separator in the direction indicated by the arrows A1, A2.

As shown in FIG. 3, a coolant flow field 52 is formed on a surface 32a of the first separator 32 oriented in the direction indicated by the arrow A1 in order to establish communication between the coolant supply passages 48 and the coolant discharge passages 50. A plurality of inlet connection grooves 54a are formed between the coolant supply passages 48 and the coolant flow field 52. A plurality of outlet connection grooves 54b are formed between the coolant flow field 52 and the coolant discharge passages 50. Further, a seal member 55 is provided on the surface 32a of the first separator 32, around the coolant supply passages 48, the coolant discharge passages 50, the coolant flow field 52, the inlet connection grooves 54a, and the outlet connection grooves 54b, and provides sealing between the inside and the outside of the seal member 55 in the surface direction.

Figure 4:
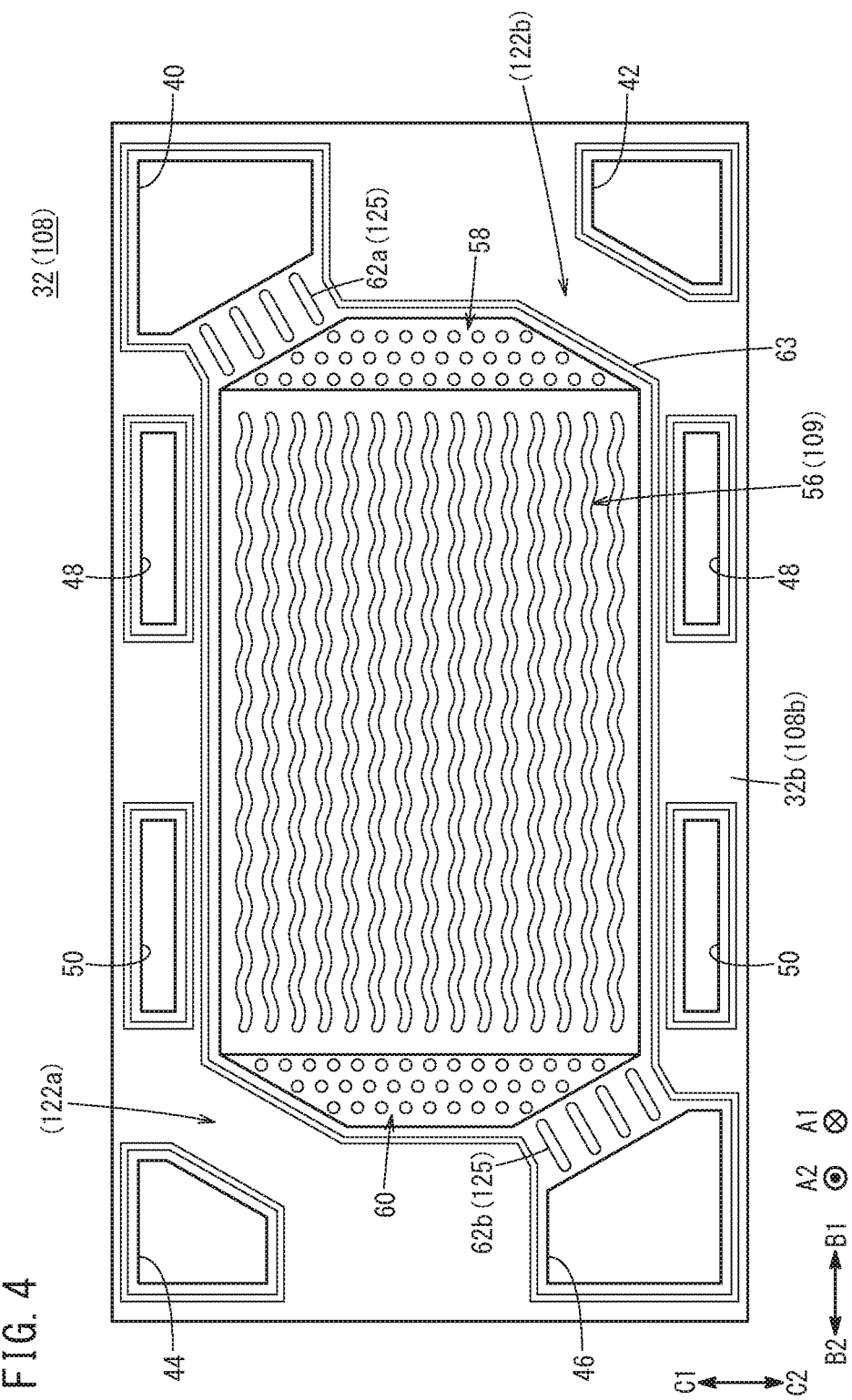
FIG. 4 is a front view showing an oxygen-containing gas flow field of a first separator.

As shown in FIG. 4, the first separator 32 has an oxygen-containing gas flow field 56 on its surface 32b oriented in the direction indicated by the arrow A2. The oxygen-containing gas flow field 56 is connected to the oxygen-containing gas supply passage 40 and the oxygen-containing gas discharge passage 46. The oxygen-containing gas flow field 56 includes a plurality of wavy flow grooves (or straight flow grooves) arranged in parallel.

An oxygen-containing gas inlet buffer 58 is connected to an inlet end of the oxygen-containing gas flow field 56, at a position outside the power generation area, and an oxygen-containing gas outlet buffer 60 is connected to an outlet end of the oxygen-containing gas flow field 56 at a position outside the power generation area.

A plurality of inlet connection grooves 62a are formed between the oxygen-containing gas inlet buffer 58 and the oxygen-containing gas supply passage 40. A plurality of outlet connection grooves 62b are formed between the oxygen-containing gas outlet buffer 60 and the oxygen-containing gas discharge passage 46. Further, a seal member 63 is provided on the surface 32b of the first separator 32, around the oxygen-containing gas supply passage 40, the oxygen-containing gas discharge passage 46, the oxygen-containing gas flow field 56, the oxygen-containing gas inlet buffer 58, the oxygen-containing gas outlet buffer 60, the inlet connection grooves 62a, and the outlet connection grooves 62b, and provides sealing between the inside and the outside of the seal member 63 in the surface direction. In the first separator 32, the back surface of the oxygen-containing gas flow field 56 forms part of the coolant flow field 52 (see FIGS. 2 and 3).

As shown in FIG. 3, the second separator 36 has a fuel gas flow field 66 on its surface 36a oriented in the direction indicated by the arrow A1. The fuel gas flow field 66 is connected to the fuel gas supply passage 44 and the fuel gas discharge passage 42. The fuel gas flow field 66 includes a plurality of wavy flow grooves (or straight flow grooves) arranged in parallel. In the embodiment of the present invention, all of the oxygen-containing gas flow field 56 and the fuel gas flow field 66 do not include serpentine flow grooves, but include straight flow grooves.

A fuel gas inlet buffer 68 is connected to the inlet end of the fuel gas flow field 66, outside the power generation area, and a fuel gas outlet buffer 70 is connected to the outlet end of the fuel gas flow field 66, outside the power generation area.

A plurality of fuel gas supply holes 72a are provided between the fuel gas inlet buffer 68 and the fuel gas supply passage 44. The fuel gas supply holes 72a penetrate through the second separator 36 in the thickness direction. The fuel gas flowing through the fuel gas supply passage 44 from the arrow A1 to the arrow A2 flows through the fuel gas supply holes 72a from the arrow A2 to the arrow A1, and then, flows into the fuel gas inlet buffer 68.

A plurality of fuel gas discharge holes 72b are formed between the fuel gas outlet buffer 70 and the fuel gas discharge passage 42. The fuel gas discharge holes 72b penetrate through the second separator 36 in the thickness direction. The fuel gas which has flowed along the fuel gas flow field 66 into the fuel gas outlet buffer 70 flows through the fuel gas discharge holes 72b from the arrow A1 to the arrow A2, and flows along the fuel gas discharge passage 42 from the arrow A2 to the arrow A1.

A seal member 73 is provided on the surface 36a of the second separator 36, around the fuel gas flow field 66, the fuel gas inlet buffer 68, the fuel gas outlet buffer 70, the fuel gas supply holes 72a, the fuel gas discharge holes 72b, and provides sealing between the inside and the outside of the seal member 73 in the surface direction.

Figure 5:
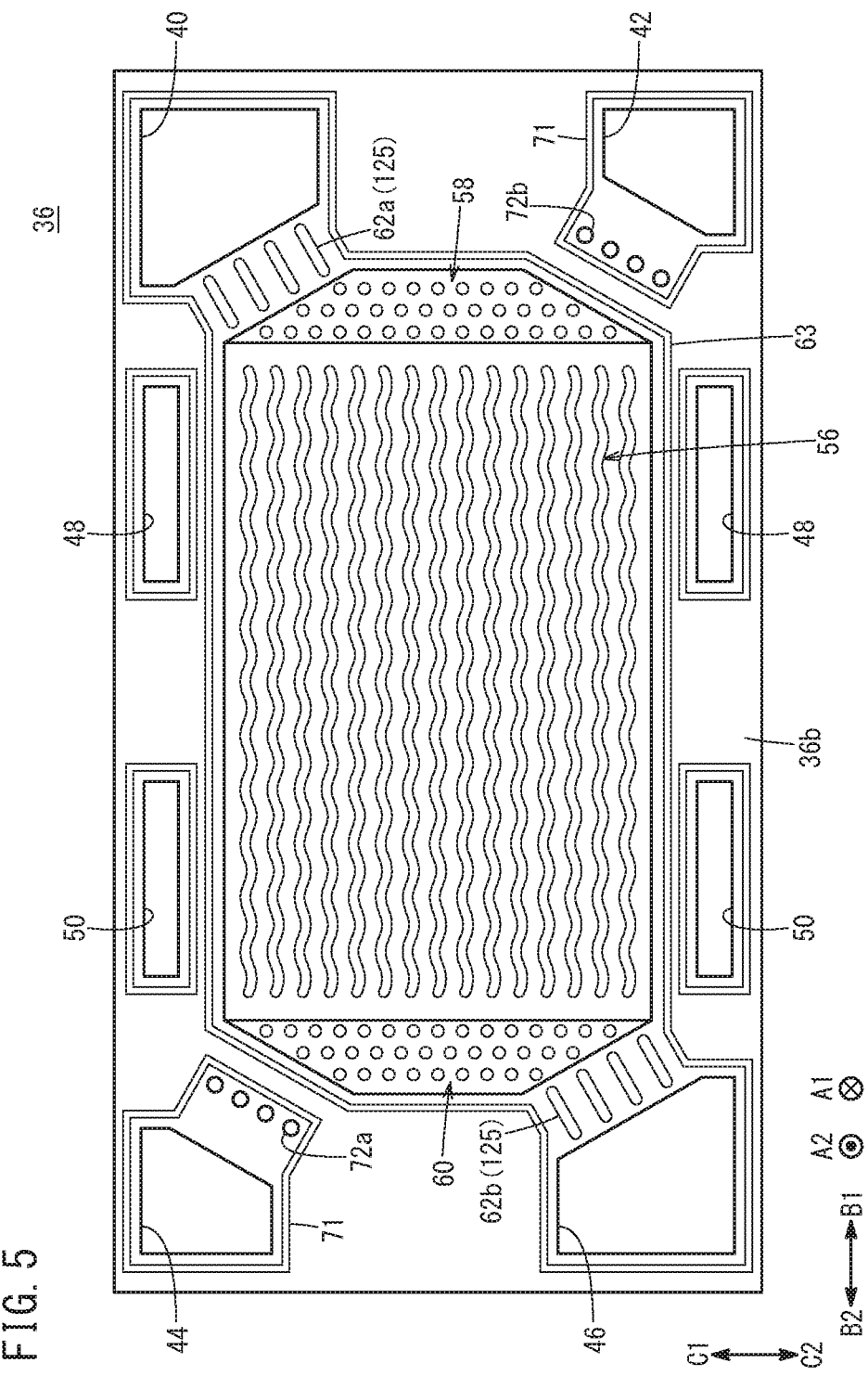
FIG. 5 is a front view showing an oxygen-containing gas flow field of a second separator.

As shown in FIG. 5, the surface 36b of the second separator 36 oriented in the direction arrow A2 has the same structure as the surface 32b of the first separator 32 (see FIG. 4) indicated by the arrow A2, except that fuel gas supply holes 72a and fuel gas discharge holes 72b surrounded by the seal member 71 are provided. That is, the oxygen-containing gas flow field 56 is formed on the surface 36b of the second separator 36. The oxygen-containing gas flow field 56 is connected to the oxygen-containing gas supply passage 40 and the oxygen-containing gas discharge passage 46. Further, an oxygen-containing gas inlet buffer 58, an oxygen-containing gas outlet buffer 60, inlet connection grooves 62a, outlet connection grooves 62b, and a seal member 63 are formed on the surface 36b of the second separator 36.

On the surface 36b of the second separator 36, the fuel gas supply holes 72a and the fuel gas discharge holes 72b are disconnected from the oxygen-containing gas inlet buffer 58 and the oxygen-containing gas outlet buffer 60 by the seal members 63, 71.

As shown in FIG. 3, the surface 38a of the third separator 38 oriented toward the arrow A1 has the same structure as the surface 36a of the second separator 36 oriented toward the arrow A1. That is, the fuel gas flow field 66 is formed on the surface 38a of the third separator 38. The fuel gas flow field 66 is connected to the fuel gas supply passage 44 and the fuel gas discharge passage 42. Further, the fuel gas inlet buffer 68, the fuel gas outlet buffer 70, the fuel gas supply holes 72a, the fuel gas discharge holes 72b, and the seal member 73 are formed on the surface 38a of the third separator 38.

Figure 6:
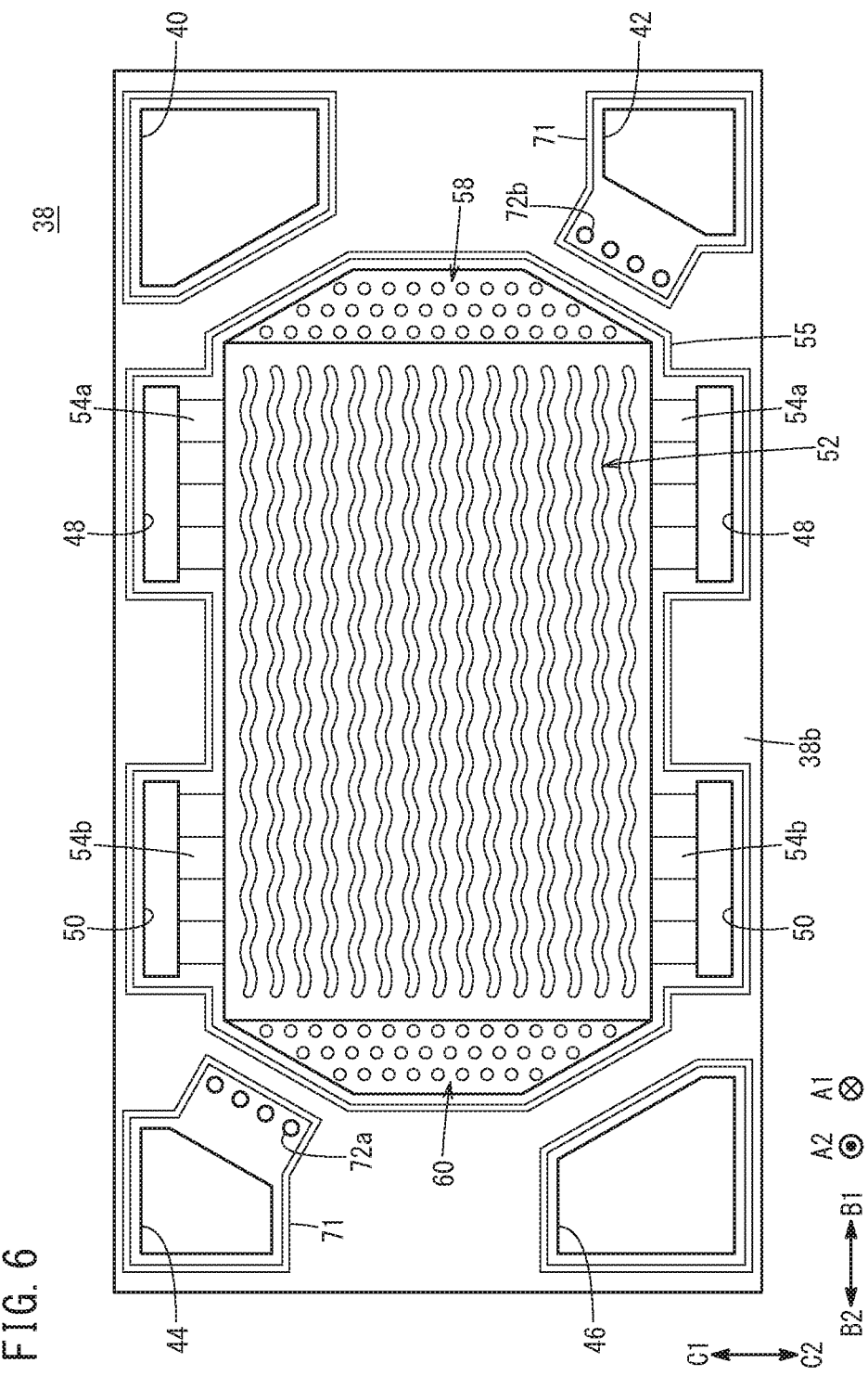
FIG. 6 is a front view showing a coolant flow field of a third separator.

As shown in FIG. 6, the surface 38b of the third separator 38 oriented in the direction arrow A2 has the same structure as the surface 32a of the first separator 32 oriented in the direction indicated by the arrow A1 (see FIG. 3), except that the fuel gas supply holes 72a and the fuel gas discharge holes 72b surrounded by the seal member 71 are provided. That is, the coolant flow field 52, the inlet connection grooves 54a, the outlet connection grooves 54b, and the seal member 55 are provided on the surface 38b of the third separator 38. On the surface 38b of the third separator 38, each of the fuel gas supply holes 72a and the fuel gas discharge holes 72b is disconnected from the coolant flow field 52, the inlet connection grooves 54a, the outlet connection grooves 54b, etc., by the seal members 55, 71.

As shown in FIG. 2, the coolant can flow between the coolant flow field 52 on the surface 38b of the third separator 38 oriented in the direction indicated by the arrow A2 and the coolant flow field 52 on the surface 32a of the first separator 32 oriented in the direction indicated by the arrow A1 that are adjacent to each other.

A seal member (not shown) is formed integrally with each of both surfaces of the separators. The seal member is made of elastic material, and provided around the outer end of each separator.

Figure 7:
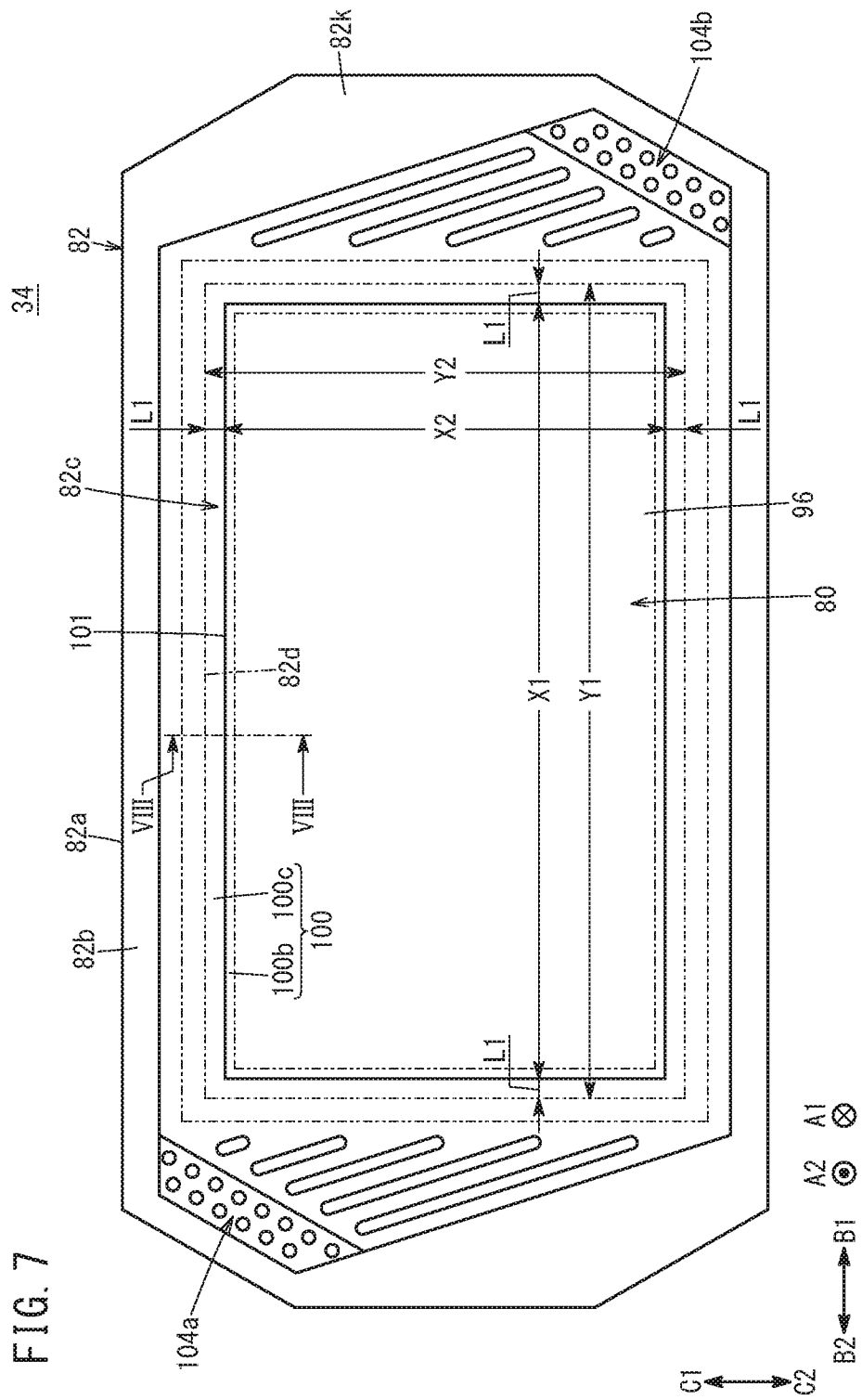
FIG. 7 is a front view showing an anode of a resin frame equipped MEA.
Figure 8:
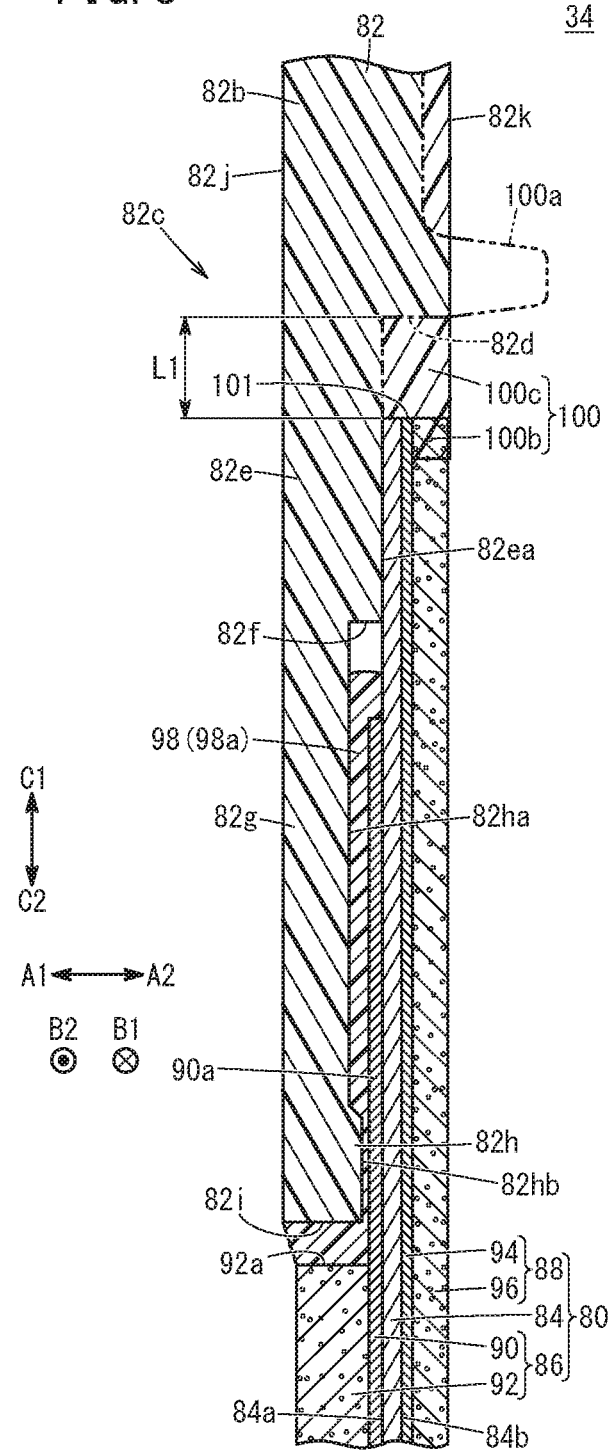
FIG. 8 is a cross sectional view taken along a line VIII-VIII in FIG. 7.

As shown in FIGS. 3, 7, and 8, the resin frame equipped MEA 34 is formed by joining a resin frame member 82 on the outer end of the membrane electrode assembly (MEA) 80. As shown in FIG. 8, the membrane electrode assembly 80 includes a solid polymer electrolyte membrane (hereinafter simply also referred to as the electrolyte membrane) 84 which is a thin membrane of perfluorosulfonic acid containing water, for example. A fluorine based electrolyte may be used as the electrolyte membrane 84. Alternatively, an HC (hydrocarbon) based electrolyte may be used as the electrolyte membrane 84. The electrolyte membrane 84 is interposed between a cathode 86 and an anode 88.

The membrane electrode assembly 80 is an MEA having different sizes of components where the surface size of the cathode 86 is smaller than the surface sizes of the anode 88 and the electrolyte membrane 84. The cathode 86, the anode 88, and the electrolyte membrane 84 may have the same surface size. Alternatively, the surface size of the anode 88 may be smaller than the surface sizes of the cathode 86 and the electrolyte membrane 84.

The cathode 86 includes a first electrode catalyst layer 90 joined to one end surface 84a of the electrolyte membrane 84 (indicated by the arrow A1) and a first gas diffusion layer 92 stacked on the first electrode catalyst layer 90. The surface size of the first electrode catalyst layer 90 is larger than the surface size of the first gas diffusion layer 92, and includes an outer exposed portion 90a protruding outward from an outer end surface 92a of the first gas diffusion layer 92. The surface size of the first electrode catalyst layer 90 is smaller than the surface size of the electrolyte membrane 84.

The anode 88 includes a second electrode catalyst layer 94 joined to the other end surface 84b of the electrolyte membrane 84 (indicated by the arrow A2) and a second gas diffusion layer 96 stacked on the second electrode catalyst layer 94. The second electrode catalyst layer 94 and the second gas diffusion layer 96 have the same surface size which is equal to (or less than) the surface size of the electrolyte membrane 84.

For example, the first electrode catalyst layer 90 is formed by porous carbon particles deposited uniformly on the surface of the first gas diffusion layer 92 together with an ion conductive polymer binder and platinum alloy supported on the porous carbon particles. For example, the second electrode catalyst layer 94 is formed by porous carbon particles deposited uniformly on the surface of the second gas diffusion layer 96 together with an ion conductive polymer binder and platinum alloy supported on the porous carbon particles.

The first gas diffusion layer 92 and the second gas diffusion layer 96 are made of electrically conductive porous body such as carbon paper or carbon cloth, etc. The surface size of the second gas diffusion layer 96 is larger than the surface size of the first gas diffusion layer 92. It should be noted that water repellant treatment may be applied to electrically conductive porous material of the first gas diffusion layer 92 and the second gas diffusion layer 96 to contain water repellent resin such as tetrafluoroetylene hexafluoropropylen copolymer (FEP). As shown in FIG. 7, the length of the long side of the second gas diffusion layer 96 is X1, and the length of the short side of the second gas diffusion layer 96 is X2.

For example, the resin frame member 82 is made of resin material such as PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the resin material may be made of a film having constant thickness, etc.

As shown in FIG. 3, the resin frame member 82 has a frame shape, and the resin frame member 82 is provided inside a group of fluid passages 40, 42, 44, 46, 48, 50 including the oxygen-containing gas supply passage 40. The fluid passages 40, 42, 44, 46, 48, 50 are not formed in the resin frame member 82. Further, as shown in FIG. 7, the resin frame member 82 includes an outer marginal portion 82b over the predetermined length inside the outer end 82a (see FIG. 7), and an inner expansion 82c inside the outer marginal portion 82b.

The inner expansion 82c includes a shelf 82e extending inward from the inner end of the outer marginal portion 82b through a first stepped surface 82d, and a thin portion 82g extending inward from the inner end of the shelf 82e through a second stepped surface 82f. The shelf 82e is thinner than the outer marginal portion 82b, and the thin portion 82g is thinner than the shelf 82e. Further, the first stepped surface 82d, the shelf 82e, the second stepped surface 82f, and the thin portion 82g are provided over the entire periphery of the resin frame member 82. The outer marginal portion of the surface 84a of the electrolyte membrane 84 contacts the surface 82ea of the shelf 82e oriented in the direction indicated by the arrow A2. At the inner end of the thin portion 82g, a bank 82h facing the outer exposed portion 90a of the first electrode catalyst layer 90 is provided over the entire periphery. Further, a groove 82ha is provided between the bank 82h and the second stepped surface 82f.

As show in FIG. 7, the distance between the first stepped surfaces 82d provided at both ends of the resin frame member 82 in the longitudinal direction (long-side direction) (indicated by the arrows B1 and B2) is Y1, and the distance between the first stepped surfaces 82d provided at both ends of the resin frame member 82 in the lateral direction (short-side direction) indicated by the arrows C1 and C2 is Y2. The first stepped surfaces 82d of the four sides of the resin frame member 82 and the outer end surface 101 of the four sides of the electrolyte membrane 84 and the anode 88 are spaced from each other by the distance L1. That is, the interval between the first stepped surface 82d and the outer end surface 101 is the same distance L1 over the entire periphery.

Adhesive 98a is filled onto the surface 84a of the electrolyte membrane 84 facing the groove 82ha and the outer exposed portion 90a of the first electrode catalyst layer 90, around the outer exposed portion 90a to form an adhesive portion 98. Further, the adhesive 98a of this adhesive portion 98 is filled between an inner end surface 82i of the resin frame member 82 and the outer end surface 92a of the first gas diffusion layer 92. As the adhesive 98a, for example, fluorocarbon resin, silicone resin, epoxy resin, etc. can be used suitably. However, the present invention is not limited in this respect. The adhesive 98a is not limited to adhesive in the liquid or solid state, thermoplastic resin, thermosetting resin, etc.

The resin frame member 82 and the outer marginal portion of the second gas diffusion layer 96 are joined together by a first joint part 100 using adhesive resin. As shown in FIG. 7, the first joint part 100 is provided around the outer end of the second gas diffusion layer 96. As shown in FIG. 8, for example, the first joint part 100 is formed by thermally deforming a resin projection 100a which is formed integrally with the resin frame member 82 in a manner that the resin projection 100a is provided around the inner end of the outer marginal portion 82b, and protrudes in the direction indicated by the arrow A2. The first joint part 100 includes a first resin impregnation portion 100b and a first molten and solidified portion 100c.

The first resin impregnation portion 100b is formed by impregnating the outer marginal portion of the second gas diffusion layer 96 with melted resin of the resin projection 100a. In the state where the first stepped surface 82d of the resin frame member 82 is spaced from the outer end surface 101 of the electrolyte membrane 84 and the anode 88 by the distance L1, molten resin projection 100a is supplied into, and solidified between the first stepped surface 82d of the resin frame member 82 and the outer end surface 101 of the electrolyte membrane 84 and the anode 88 to form the first molten and solidified portion 100c. In FIG. 8, the surface of the shelf 82e and the first stepped surface 82d formed integrally with the first molten and solidified portion 100c are denoted by a two dot chain line.

The adhesive portion 98 is provided around the outer exposed portion 90a of the first electrode catalyst layer 90 and the outer end surface 92a of the first gas diffusion layer 92. The first joint part 100 is provided around the outer marginal portion of the second gas diffusion layer 96 to prevent cross leakage, etc. between the cathode 86 and the anode 88.

As shown in FIG. 3, an oxygen-containing gas inlet buffer 102a and an oxygen-containing gas outlet buffer 102b are provided on the surface 82j of the resin frame member 82 facing the cathode 86 (oriented in the direction indicated by the arrow A1). As shown in FIG. 7, a fuel gas inlet buffer 104a and a fuel gas outlet buffer 104b are provided on the surface 82k of the resin frame member 82 facing the anode 88 (oriented in the direction indicated by the arrow A2).

As shown in FIG. 2, the first end power generation unit 16 is formed by stacking a dummy first separator 105, a resin frame equipped dummy assembly 106 on the dummy first separator 105, a dummy second separator 108 on the resin frame equipped dummy assembly 106, the resin frame equipped MEA 34 on the dummy second separator 108, and the third separator 38 on the resin frame equipped MEA 34, from the side indicated by the arrow A1 to the side indicated by the arrow A2.

As shown in FIGS. 2 to 4, the dummy first separator 105 has the same structure as the first separator 32. The coolant flow field 52 is provided on a surface 105a of the dummy first separator 105 at one end (indicated by the arrow A1). First space 109 corresponding to the oxygen-containing gas flow field 56 is provided between the surface 105b of the dummy first separator 105 at the other end (indicated by the arrow A2) and one end side of the resin frame equipped dummy assembly 106 (indicated by the arrow A1). The first space 109 is connected to the oxygen-containing gas supply passage 40 and the oxygen-containing gas discharge passage 46 through a connection channel 125 formed inside the inlet connection grooves 62a and the outlet connection grooves 62b. Therefore, the oxygen-containing gas can flow through the first space 109, like the oxygen-containing gas flow field 56.

Figure 9:
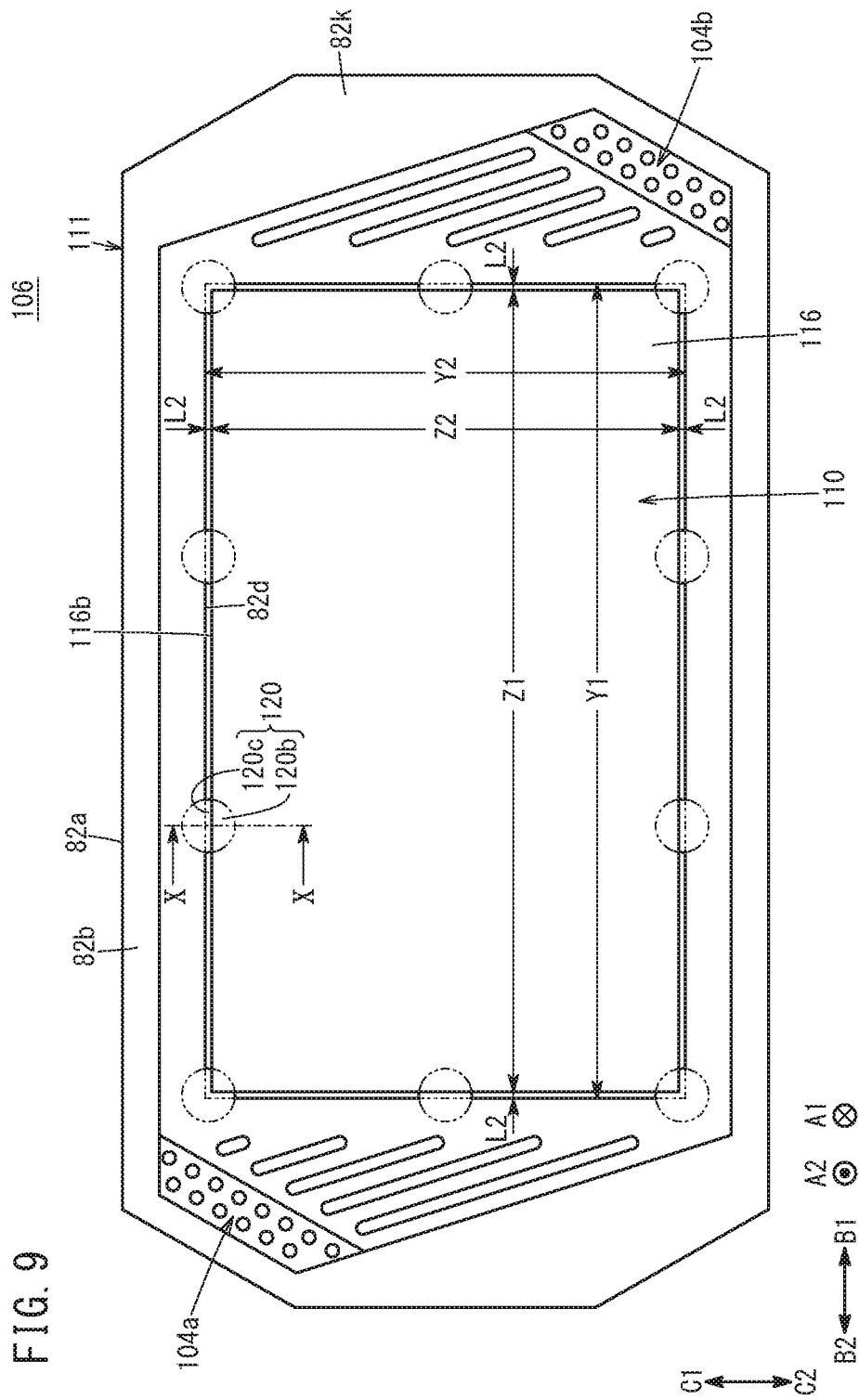
FIG. 9 is a front view showing a third electrically conductive porous body of a resin frame equipped dummy assembly.
Figure 10:
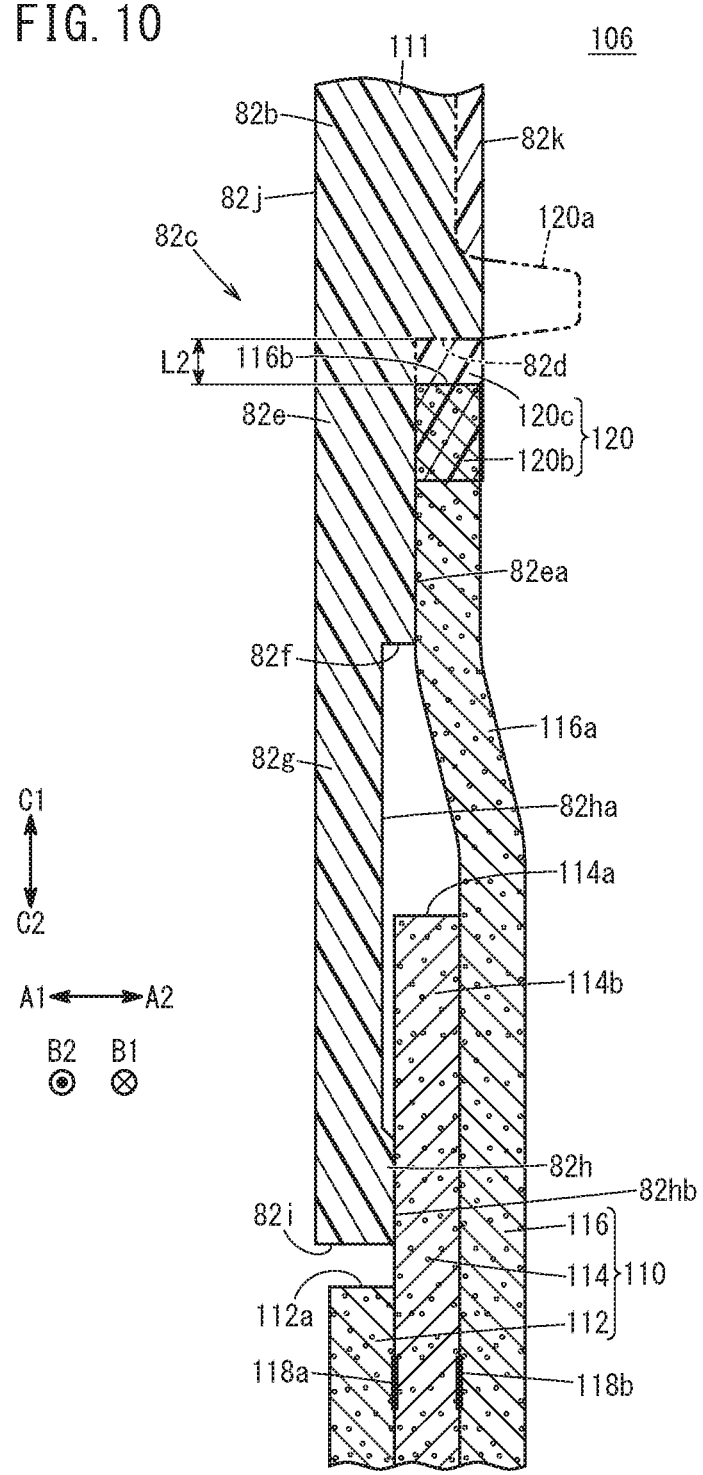
FIG. 10 is a cross sectional view taken along a line X-X in FIG. 9.
Figure 11:
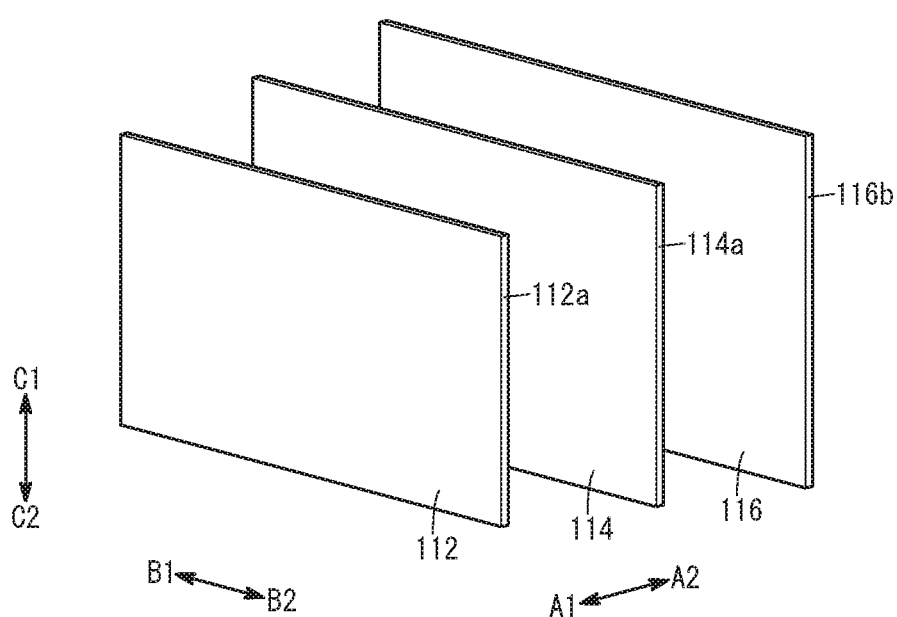
FIG. 11 is an exploded perspective view showing a dummy assembly.

As shown in FIGS. 9 and 10, the resin frame equipped dummy assembly 106 is formed by joining a dummy resin frame member 111 on the outer end of a dummy assembly 110. As shown in FIGS. 10 and 11, the dummy assembly 110 is formed by stacking three electrically conductive porous bodies having different surface sizes (surfaces area/outer size) together, to include, from the arrow A1 to the arrow A2, a first electrically conductive porous body 112, a second electrically conductive porous body 114 stacked on the first electrically conductive porous body 112, and a third electrically conductive porous body 116 stacked on the second electrically conductive porous body 114.

With regard to the surface size, the following relationship is set: First electrically conductive porous body 112<Second electrically conductive porous body 114<Third electrically conductive porous body 116. Therefore, as shown in FIG. 10, an outer exposed portion 116a is provided in the outer marginal portion of the third electrically conductive porous body 116. The outer exposed portion 116a protrudes outward beyond the outer end surface 114a of the second electrically conductive porous body 114 over the entire periphery. An outer exposed portion 114b is provided in the outer marginal portion of the second electrically conductive porous body 114. The outer exposed portion 114b protrudes outward beyond the outer end surface 112a of the first electrically conductive porous body 112 over the entire periphery.

In the dummy assembly 110, the surface size of the third electrically conductive porous body 116 having the largest surface size is larger than the surface size of the second gas diffusion layer 96. As shown in FIG. 9, the length of the long side of the third electrically conductive porous body 116 is Z1, and the length of the short side of the third electrically conductive porous body 116 is Z2. Therefore, the following relationship is present among these Z1 and Z2, the length X1 of the long side, and the length X2 of the short side of the second gas diffusion layer 96. That is, Z1>X1 and Z2>X2. The first stepped surface 82d of the four sides of the dummy resin frame member 111 and an outer end surface 116b of the four sides of the third electrically conductive porous body 116 are spaced from each other by the distance L2. That is, the interval between the first stepped surface 82d and the outer end surface 116b is the distance L2 over the entire periphery.

In the dummy assembly 110, the above water repellent treatment may be applied to the second electrically conductive porous body 114 or the third electrically conductive porous body 116. The first electrically conductive porous body 112, the second electrically conductive porous body 114, and the third electrically conductive porous body 116 are made of the same material except this water repellent treatment, and may be made of the same material as the electrically conductive porous body of the first gas diffusion layer 92 or the second gas diffusion layer 96.

Further, in the embodiment of the present invention, the first electrically conductive porous body 112, the second electrically conductive porous body 114, and the third electrically conductive porous body 116 have the same thickness as the electrically conductive porous body of the second gas diffusion layer 96. Therefore, by adjusting the surface size of the electrically conductive porous body as described above, it is possible to obtain the dummy assembly 110 more easily.

As shown in FIG. 10, the stacked first electrically conductive porous body 112 and the second electrically conductive porous body 114 are joined together by an adhesive layer 118a, and the second electrically conductive porous body 114 and the third electrically conductive porous body 116 are joined together by an adhesive layer 118b. As in the case of the adhesive portion 98, the adhesive layers 118a, 118b may use the adhesive 98a.

As shown in FIGS. 9 and 10, the dummy resin frame member 111 has the same structure as the resin frame member 82 of the resin frame equipped MEA 34 in FIGS. 7 and 8, and includes the outer marginal portion 82b and the inner expansion 82c. As shown in FIG. 10, an outer exposed portion 116a of the third electrically conductive porous body 116 on the side indicated by the arrow A1 contacts a shelf 82e of the inner expansion 82c. Part of the outer exposed portion 116a of the third electrically conductive porous body 116 on the side indicated by the arrow A1 and the outer exposed portion 114b of the second electrically conductive porous body 114 on the side indicated by the arrow A1 are provided adjacent to the groove 82ha. The outer exposed portion 114b of the second electrically conductive porous body 114 on the side indicated by the arrow A1 contacts a protruding end surface 82hb (contact surface) of the bank 82h.

In the direction indicated by the arrows A1 and A2, the outer end surface 114a of the second electrically conductive porous body 114 is provided between the third electrically conductive porous body 116 and the groove 82ha. The inner end surface 82i of the dummy resin frame member 111 is positioned between the outer end surface 114a of the second electrically conductive porous body 114 and the outer end surface 112a of the first electrically conductive porous body 112 in a direction perpendicular to the stacking direction (arrows A1, A2). The outer end surface 112a of the first electrically conductive porous body 112 faces the inner end surface 82i of the dummy resin frame member 111 at an interval. The height of the second stepped surface 82f is smaller than the thickness of the second electrically conductive porous body 114.

In the dummy assembly 110, the outer exposed portion 116a of the third electrically conductive porous body 116 having the largest surface size and the surface 82ea (joint surface) of the shelf 82e of the dummy resin frame member 111 on the side indicated by the arrow A2 are joined together through a second joint part 120 (joint part) to form the resin frame equipped dummy assembly 106. As shown in FIG. 9, the second joint part 120 is provided discontinuously (in a spot pattern) in the peripheral direction, in the outer marginal portion of the third electrically conductive porous body 116. It should be noted that the second joint part 120 may be continuously formed around the dummy assembly 110.

As shown in FIG. 10, the second joint part 120 may be formed by thermally deforming part of a resin projection 120a which is formed integrally with the dummy resin frame member 111. In this case, the second joint part 120 includes a second resin impregnation portion 120b and a second molten and solidified portion 120c. It should be noted that portion of the resin protrusion 120a which does not form the second joint part 120, i.e., the remaining portion of the resin protrusion which has not been thermally deformed may be eliminated by machining, etc.

The second resin impregnation portion 120b is formed by impregnating an outer marginal portion of the third electrically conductive porous body 116 with melted resin of the resin projection 120a. In the state where the first stepped surface 82d of the dummy resin frame member 111 is spaced from the outer end surface 116b of the third electrically conductive porous body 116 by the distance L2, the second molten and solidified portion 120c is formed by supplying, and solidifying molten resin of the resin projection 120a between the first stepped surface 82d of the dummy resin frame member 111 and the outer end surface 116b of the third electrically conductive porous body 116. In FIG. 10, the surface of the shelf 82e and the first stepped surface 82d formed integrally with the second molten and solidified portion 120c are denoted by a two dot chain line. As in the case of the adhesive portion 98, the adhesive 98a may be used for the first joint part 100 and the second joint part 120.

As described above, the lengths X1, X2 of the second gas diffusion layer 96 are smaller than the lengths Z1, Z2 of the third electrically conductive porous body 116. Therefore, as shown in FIGS. 7 and 9, the spacing distance L1 as the difference between the distances Y1, Y2 between the first stepped surfaces 82d of the resin frame member 82 and the lengths X1, X2 of the second gas diffusion layer 96 is larger than the spacing distance L2 as the difference between the distances Y1 and Y2 between the first stepped surfaces 82d and the lengths Z1, Z2 of the third electrically conductive porous body 116 (L1>L2).

Figure 12:
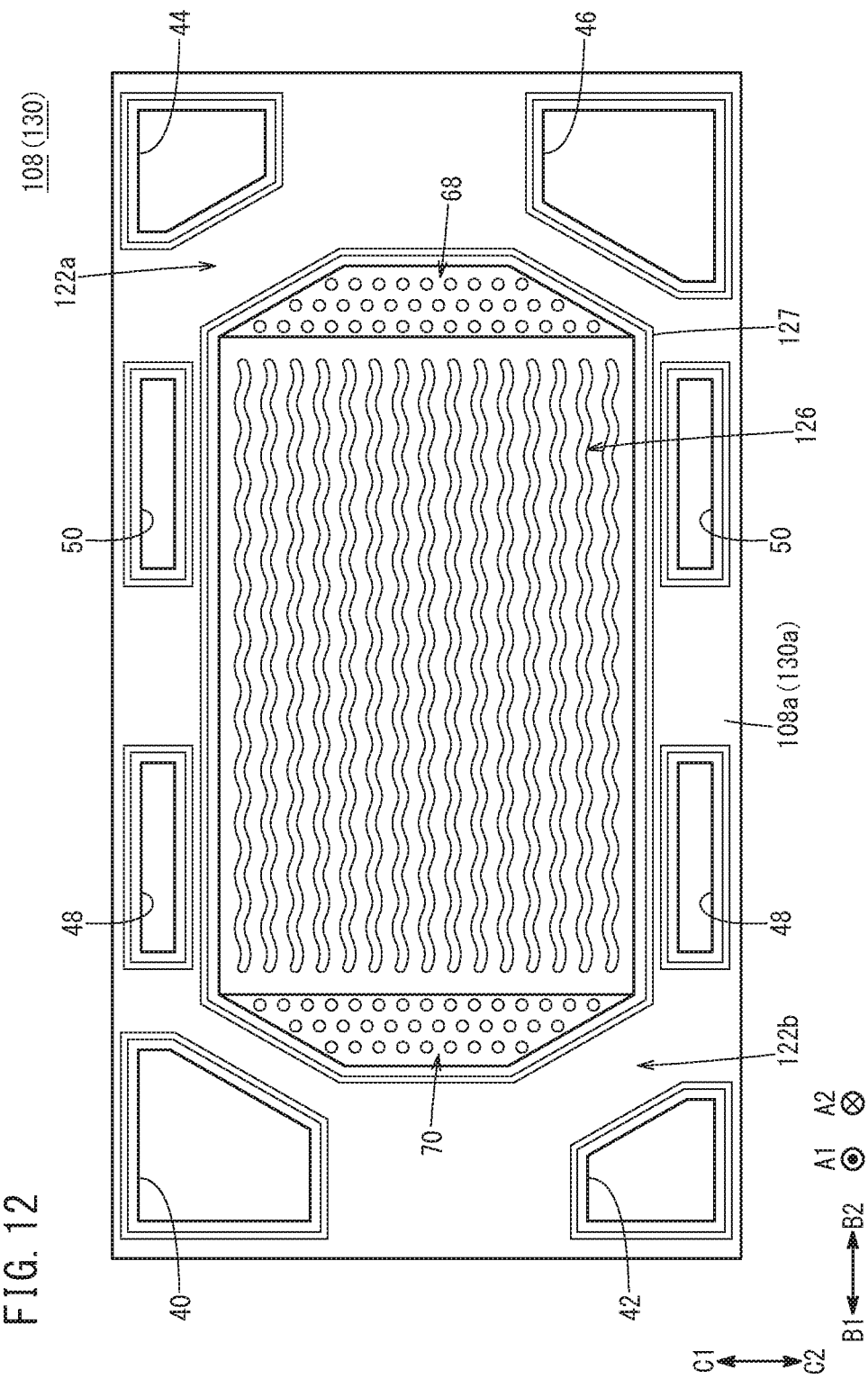
FIG. 12 is a front view showing a second space of a dummy second separator and a dummy third separator.

As shown in FIGS. 2, 3, and 12, the dummy second separator 108 has the same structure as the second separator 36 except that an inlet blocking part 122a is provided instead of the fuel gas supply holes 72a, and an outlet blocking part 122b is provided instead of the fuel gas discharge holes 72b. That is, the surface 108b at the other end of the dummy second separator 108 (oriented in the direction indicated by the arrow A2) has the same structure as the surface 32b at the other end of the first separator 32 shown in FIG. 4 (oriented in the direction indicated by the arrow A2).

As shown in FIGS. 2 and 4, an oxygen-containing gas flow field 56 is formed between the surface 108b at the other end of the dummy second separator 108 (oriented in the direction indicated by the arrow A2) and the cathode 86 of the resin frame equipped MEA 34 (oriented in the direction indicated by the arrow A1).

As shown in FIGS. 2 and 12, second space 126 corresponding to the fuel gas flow field 66 is provided between the surface 108a at one end of the dummy second separator 108 (oriented in the direction indicated by the arrow A1) and the other end of the resin frame equipped dummy assembly 106 (closer to the third electrically conductive porous body 116, oriented in the direction indicated by the arrow A2). The second space 126 is disconnected from the fuel gas supply passage 44 by the inlet blocking part 122a, and the second space 126 is disconnected from fuel gas discharge passage 42 by the outlet blocking part 122b. That is, since the flow of the fuel gas in the second space 126 is restricted by the inlet blocking part 122a and the outlet blocking part 122b (also referred to as the blocking part collectively), heat insulating space is formed inside the second space 126.

Only one of the inlet blocking part 122a and the outlet blocking part 122b may be provided to restrict the flow of the fuel gas in the second space 126, and form the heat insulating space. Further, the blocking part may be formed, e.g., by making the fuel gas supply holes 72a and the fuel gas discharge holes 72b which do not penetrate through the dummy second separator 108 beforehand (see FIG. 3), or making the fuel gas supply holes 72a and the fuel gas discharge holes 72b which penetrate through the dummy second separator 108 and thereafter, closing the fuel gas supply holes 72a and the fuel gas discharge holes 72b. Further, a seal member 127 is provided on the surface 108a of the dummy second separator 108 around the second space 126 to provide sealing between the inside and the outside of the seal member 127 in the surface direction.

As described above, in the dummy assembly 110 (resin frame equipped dummy assembly 106) sandwiched between the dummy first separator 105 and the dummy second separator 108, the first space 109 is provided adjacent to the first electrically conductive porous body 112, and the second space 126 is provided adjacent to the third electrically conductive porous body 116.

As shown in FIG. 2, the first dummy cell 18 includes, from the side indicated by the arrow A1 to the side indicated by the arrow A2, a dummy first separator 105 (dummy separator), a resin frame equipped dummy assembly 106 stacked on the dummy first separator 105, a dummy second separator 108 (dummy separator) stacked on the resin frame equipped dummy assembly 106, a resin frame equipped dummy assembly 106 stacked on the dummy second separator 108, and a dummy third separator 130 (dummy separator) stacked on the resin frame equipped dummy assembly 106.

As shown in FIGS. 2, 3, and 6, the surface 130b at the other end of the dummy third separator 130 (indicated by the arrow A2) has the same structure as the surface 38b of the third separator 38 oriented in the direction indicated by the arrow A2 except that the fuel gas supply holes 72a and the fuel gas discharge holes 72b surrounded by the seal member 71 are not provided. Stated otherwise, the surface 130b of the dummy third separator 130 has the same structure as the surface 32a of the first separator 32 at one end (oriented in the direction indicated by the arrow A1). Further, as shown in FIGS. 2 and 12, the surface 130a of the dummy third separator 130 oriented in the direction indicated by the arrow A1 has the same structure as the surface 108a of the dummy second separator 108 oriented in the direction indicated by the arrow A1.

As shown in FIG. 2, a coolant flow field 52 is provided between the surface 130b of the dummy third separator 130 oriented in the direction indicated by the arrow A2 and the dummy first separator 105 of the first end power generation unit 16. As shown in FIGS. 2 and 12, the second space 126 corresponding to the fuel gas flow field 66 is provided between the surface 130a of the dummy third separator 130 oriented in the direction indicated by the arrow A1 and the third electrically conductive porous body 116 of the resin frame equipped dummy assembly 106 (oriented in the direction indicated by the arrow A2). Further, in the first dummy cell 18, the second space 126 is formed between the surface 108a of the dummy second separator 108 on the side indicated by the arrow A1 and the resin frame equipped dummy assembly 106 on the side closer to the third electrically conductive porous body 116.

Further, in the first dummy cell 18, the first space 109 is formed between the surface 105b of the dummy first separator 105 on the side indicated by the arrow A2 and the first electrically conductive porous body 112 on the side closer to the resin frame equipped dummy assembly 106, and between the surface 108b of the dummy second separator 108 on the side indicated by the arrow A2 and the first electrically conductive porous body 112 on the side closer to the resin frame equipped dummy assembly 106.

The second dummy cell 20 includes, from the arrow A1 to the arrow A2, a dummy first separator 105, a resin frame equipped dummy assembly 106 stacked on the dummy first separator 105, and a dummy third separator 130 stacked on the resin frame equipped dummy assembly 106. Therefore, in the second dummy cell 20, the first space 109 is formed between the surface 105b of the dummy first separator 105 on the side indicated by the arrow A2 and the resin frame equipped dummy assembly 106 on the side closer to the first electrically conductive porous body 112 (indicated by the arrow A1). Further, the second space 126 is formed between the surface 130a of the dummy third separator 130 on the side indicated by the arrow A1 and the resin frame equipped dummy assembly 106 on the side closer to the third electrically conductive porous body 116 (indicated by the arrow A2). The third dummy cell 24 has the same structure as the second dummy cell 20.

Separators which can be used as the second dummy cell 20 and the third dummy cell 24 are not limited to have the above structure. For example, the second dummy cell 20 may have structure where, from the arrow A1 to the arrow A2, the dummy second separator 108 is provided, the resin frame equipped dummy assembly 106 is stacked on the dummy second separator 108, and the first separator 32 is stacked on the resin frame equipped dummy assembly 106. The third dummy cell 24 may have structure where, from the arrow A1 to the arrow A2, the first separator 32 is provided, the resin frame equipped dummy assembly 106 is stacked on the first separator 32, and the dummy second separator 108 is stacked on the resin frame equipped dummy assembly 106.

In the second end power generation unit 22, from the arrow A1 to the arrow A2, the first separator 32 is provided, the resin frame equipped MEA 34 is stacked on the first separator 32, the dummy second separator 108 is stacked on the resin frame equipped MEA 34, the resin frame equipped dummy assembly 106 is stacked on the dummy second separator 108, and the dummy third separator 130 is stacked on the resin frame equipped dummy assembly 106. Therefore, in the second end power generation unit 22, the first space 109 is formed between the surface 108b of the dummy second separator 108 on the side indicated by the arrow A2 and the resin frame equipped dummy assembly 106 on the side closer to the first electrically conductive porous body 112.

Further, the second space 126 is formed between the surface 130a of the dummy third separator 130 on the side indicated by the arrow A1 and the resin frame equipped dummy assembly 106 on the side closer to the third electrically conductive porous body 116.

The terminal plates 26a, 26b are made of electrically conductive material. For example, the terminal plates 26a, 26b are made of metal such as copper, aluminum, or stainless steel. As shown in FIG. 1, terminals 132a, 132b are provided at substantially central positions of the terminal plates 26a, 26b. The terminals 132a, 132b protrude outward in the stacking direction.

The terminal 132a is inserted into an insulating cylinder 134a to pass through a hole 136a of the insulator 28a and a hole 138a of the end plate 30a. The terminal 132a protrudes to the outside of the end plate 30a. The terminal 132b is inserted into an insulating cylinder 134b to pass through a hole 136b of the insulator 28b and a hole 138b of the end plate 30b. The terminal 132b protrudes to the outside of the end plate 30b.

The insulators 28a, 28b are made of electrically insulating resin such as polycarbonate (PC) resin, phenol resin, etc. Recesses 140a, 140b are formed at the centers of the insulators 28a, 28b. The recesses 140a, 140b are opened to the stack body 14. The recesses 140a, 140b are connected to holes 136a, 136b.

Reactant gas passages are formed in the insulator 28a and the end plate 30a. A coolant supply passage 48 and a coolant discharge passage 50 are formed in the insulator 28b and the end plate 30b.

The terminal plate 26a and heat insulating body 142 are accommodated in the recess 140a. A terminal plate 26b and an insulating body 142 are accommodated in the recess 140b. The heat insulating body 142 is formed by sandwiching an electrically conductive heat insulating member 146 between a pair of electrically conductive heat insulating plates 144. For example, the heat insulating plate 144 is a flat porous carbon plate, and the heat insulating member 146 is a metal plate having a corrugated shape in cross section.

The heat insulating plate 144 may be made of the same material as that of the heat insulating member 146. Further, the heat insulating body 142 may include one heat insulating plate 144 and one heat insulating member 146. Further, resin spacers (not shown) may be interposed between the terminal plates 26a, 26b and bottoms of the recesses 140a, 140b of the insulators 28a, 28b.

The fuel cell stack 10 basically has the structure as described above. Hereinafter, a method of producing a dummy cell according to an embodiment of the present invention will be described below taking a case where the first dummy cell 18 of the fuel cell stack 10 is obtained as an example.

Firstly, a water repellent treatment step of applying water repellent treatment to the second electrically conductive porous body 114 or the third electrically conductive porous body 116 is performed. The water repellent treatment is performed, e.g., by impregnating the second electrically conductive porous body 114 or the third electrically conductive porous body 116 with dispersion liquid of FEP, and thereafter, drying the second electrically conductive porous body 114 or the third electrically conductive porous body 116 for 30 minutes at 120° C.

Next, as shown in FIG. 11, a first stacking step is performed by stacking the first electrically conductive porous body 112, the second electrically conductive porous body 114, and the third electrically conductive porous body 116 while providing the adhesive layer 118a or the adhesive layer 118b between these layers in a spot pattern. In this manner, the dummy assembly 110 can be obtained.

Next, as shown in FIGS. 9 and 10, a resin frame joining step is performed by providing the dummy resin frame member 111 around the dummy assembly 110 to obtain the resin frame equipped dummy assembly 106.

Specifically, the outer exposed portion 116a of the third electrically conductive porous body 116 on the side indicated by the arrow A1 is stacked on the shelf 82e of the dummy resin frame member 111, and the outer exposed portion 114b of the second electrically conductive porous body 114 is provided adjacent to the groove 82ha of the dummy resin frame member 111. The outer end surface 112a of the first electrically conductive porous body 112 is provided to face the inner end surface 82i of the dummy resin frame member 111. At this time, the outer exposed portion 114b of the second electrically conductive porous body 114 on the side indicated by the arrow A1 is brought into contact with the protruding end surface 82hb of the bank 82h.

Then, the resin projection 120a provided in the dummy resin frame member 111 is heated by a heater (not shown), and molten and solidified by applying a load to the resin projection 120a, to discontinuously form the second joint part 120 made up of the second resin impregnation portion 120b and the second molten and solidified portion 120c as described above. In this manner, by joining the shelf 82e of the dummy resin frame member 111 and the outer marginal portion of the third electrically conductive porous body 116 together, it is possible to obtain the resin frame equipped dummy assembly 106.

After the two resin frame equipped dummy assemblies 106 are obtained in the manner as described above, as shown in FIG. 2, a second stacking step is performed by providing the dummy first separator 105, stacking the resin frame equipped dummy assembly 106 on the dummy first separator 105, the dummy second separator 108 on the resin frame equipped dummy assembly 106, the resin frame equipped dummy assembly 106 on the dummy second separator 108, and the dummy third separator 130 on the resin frame equipped dummy assembly 106. In this manner, it is possible to obtain the first dummy cell 18.

It should be noted that the second dummy cell 20 and the third dummy cell 24 can be obtained by sandwiching the resin frame equipped dummy assembly 106 between the dummy first separator 105 and the dummy third separator 130.

Operation of the fuel cell stack 10 having the first dummy cell 18, the second dummy cell 20, and the third dummy cell 24 obtained as described above will be described below. Firstly, as shown in FIG. 1, an oxygen-containing gas is supplied to the oxygen-containing gas supply passage 40 of the end plate 30a. A fuel gas such as a hydrogen-containing gas is supplied to the fuel gas supply passage 44 of the end plate 30a. A coolant such as pure water ethylene glycol or oil is supplied to the coolant supply passages 48 of the end plate 30b.

As shown in FIGS. 4 and 5, the oxygen-containing gas supplied to the oxygen-containing gas supply passage 40 flows into the oxygen-containing gas flow field 56 and the first space 109 through the connection channel 125 formed inside the inlet connection grooves 62a. Thus, the oxygen-containing gas flows along each of the separators and dummy separators (the dummy first separator 105, the dummy second separator 108, the dummy third separator 130) in the longitudinal direction from the side indicated by the arrow B1 to the side indicated by the arrow B2, and the oxygen-containing gas is supplied to the cathode 86 of the membrane electrode assembly 80 and the dummy assembly 110.

As shown in FIG. 3, the fuel gas supplied to the fuel gas supply passage 44 flows into the fuel gas flow field 66 of the second separator 36 and the third separator 38 through the fuel gas supply holes 72a. Therefore, the fuel gas flows along each of the separators from the side indicated by the arrow B2 to the side indicated by the arrow B1 in the longitudinal direction, and the fuel gas is supplied to the anode 88 of the membrane electrode assembly 80. In the meanwhile, as shown in FIG. 12, the flow of the fuel gas into the second space 126 of the dummy second separator 108 and the dummy third separator 130 is blocked by the inlet blocking part 122a.

In the membrane electrode assembly 80 to which the reactant gases are supplied as described above, the oxygen-containing gas supplied to each cathode 86 and the fuel gas supplied to each anode 88 are consumed in electrochemical reactions in the first electrode catalyst layer 90 and the second electrode catalyst layer 94 to generate electricity.

Then, after the oxygen-containing gas is supplied to each cathode 86, and some of the oxygen-containing gas is consumed at the cathode 86, the oxygen-containing gas is discharged from each of the oxygen-containing gas flow field 56 and the first space 109 to the oxygen-containing gas discharge passage 46 through the connection channel 125 formed inside the outlet connection grooves 62b. Then, the oxygen-containing gas is discharged to the outside of the fuel cell stack 10 through the oxygen-containing gas discharge passage 46 of the end plate 30a.

Likewise, after the fuel gas is supplied to each anode 88, and some of the fuel gas is supplied from the fuel gas flow field 66 to the fuel gas discharge passage 42 through the inside of the fuel gas discharge holes 72b. Then, the fuel gas is discharged to the outside of the fuel cell stack 10 through the fuel gas discharge passage 42 of the end plate 30a.

In this regard, the flow of the fuel gas between the second space 126 and the fuel gas discharge passage 42 is blocked by the outlet blocking part 122b. Therefore, as described above, the flow of the fuel gas into the second space 126 is blocked by the inlet blocking part 122a, and entry of the fuel gas from the fuel gas discharge passage 42 into the second space 126 is avoided by the outlet blocking part 122b. As a result, in the second space 126, the flow of the fuel gas is blocked by the blocking part. Thus, the second space 126 functions as heat insulating space.

Further, the coolant supplied to each of the coolant supply passages 48 flows into the coolant flow field 52 between the dummy third separator 130 and the first separator 32 that are adjacent to each other, and the coolant flow field 52 between the third separator 38 and the first separator 32 that are adjacent to each other. The coolant which flowed from each of the coolant supply passages 48 on the side in the direction indicated by the arrow C1 and the coolant which flowed from the coolant supply passage 48 on the side indicated by the arrow C2 flow toward each other, in the direction indicated by the arrows C1 and C2, and then, flow in the direction indicated by the arrow B2, and move away from each other in the direction indicated by the arrows C1 and C2 while cooling the membrane electrode assembly 80. The coolant is discharged through each of the coolant discharge passages 50.

As described above, in each of the dummy cells of the fuel cell stack 10 according to the embodiment of the present invention, the dummy assembly 110 is formed by stacking the first electrically conductive porous body 112, the second electrically conductive porous body 114, and the third electrically conductive porous body 116 together. Unlike the dummy cell (not shown) according to the comparative example using the metal plate instead of the electrolyte membrane 84 of the membrane electrode assembly 80, this dummy assembly 110 can be obtained at low cost since there is no need to provide members comprising a plurality of materials such as the electrically conductive porous body and the metal plate. Further, since the dummy assembly 110 is made up of the three electrically conductive porous bodies, i.e., the first electrically conductive porous body 112, the second electrically conductive porous body 114, and the third electrically conductive porous body 116, and the first gas diffusion layer 92 and the second gas diffusion layer 96 of the membrane electrode assembly 80 are made up of electrically conductive porous bodies as well, it is possible to reduce the burden of providing constituent elements dedicated to each of the dummy cells.

Further, the dummy assembly 110 is formed by stacking the three electrically conductive porous bodies having different surface sizes, i.e., the first electrically conductive porous body 112, the second electrically conductive porous body 114, and the third electrically conductive porous body 116, to provide steps for joining the dummy resin frame member 104 in the outer marginal portion of the dummy assembly 110. Therefore, for example, without requiring a special production process of providing a step in an outer marginal portion of the electrically conductive porous body (not shown) which is formed integrally, it is possible to obtain the dummy assembly 110 relatively easily.

By providing the above dummy assembly 110, it is possible to provide each of the dummy cells having simple and economical structure.

Further, each of the dummy cells includes the dummy assembly 110 in correspondence with the membrane electrode assembly 80 of the power generation cell 12. That is, since each of the dummy cells does not include the electrolyte membrane 84, the first electrode catalyst layer 90, and the second electrode catalyst layer 94, power generation is not performed, and thus, no water is produced as a result of power generation. Therefore, each of the dummy cells itself functions as a heat insulating layer, and it is possible to suppress water condensation in each of the dummy cells.

Since the first dummy cell 18 and the second dummy cell 20 are provided at the end of the stack body 14 in the direction indicated by the arrow A1, and the third dummy cell 24 is provided at the end of the stack body 14 oriented in the direction indicated by the arrow A2, it is possible to improve heat insulating performance at the end of the stack body 14. Therefore, even in the environment at low temperature, it is possible to suppress decrease in the temperature at the ends of the stack body 14 in comparison with the central position of the stack body 14.

Further, since it is possible to improve the heat insulating performance at the end of the stack body 14 as describe above, even in the case of starting operation of the fuel cell stack 10 below the freezing temperature, it is possible to effectively increase the temperature of the entire stack body 14. Therefore, it is possible to suppress decrease in the voltage due to freezing of the produced water, etc. at the ends of the stack body 14.

Accordingly, in the fuel cell stack 10, by the dummy cells each having simple and economical structure, it is possible to suppress influence of the external air temperature on the fuel cell stack 10, and improve the power generation stability.

In the fuel cell stack 10, since water repellant treatment is applied to the second electrically conductive porous body 114 or the third electrically conductive porous body 116, it is possible to suppress stagnation of the liquid water such as condensed water or the produced water in each of the dummy cells. As a result, even under the environment at low temperature, it is possible to avoid freezing of each of the dummy cells.

As described above, in the dummy assembly 110 of each dummy cell which does not perform power generation, there is no need to adopt dimensional tolerance as in the case of the membrane electrode assembly 80 of the power generation cell 12 which performs power generation. Further, the dummy resin frame member 111 provided at the outer end of the dummy assembly 110 has the same structure as the resin frame member 82 provided on the outer end of the membrane electrode assembly 80.

Therefore, by making the surface size of the third electrically conductive porous body 116 larger than the surface size of the second gas diffusion layer 96, it is possible to make the joining area between the dummy assembly 110 and the dummy resin frame member 111 larger than the joining area between the membrane electrode assembly 80 and the resin frame member 82. In this manner, it is possible to improve the joining strength of the dummy resin frame member 111 and the dummy assembly 110.

At the time of aligning the dummy resin frame member 111 with the dummy assembly 110 before joining these components together, for producing the resin frame equipped dummy assembly 106, it is possible to make the positional adjustment in correspondence with the distance L2 between the first stepped surface 82d of the dummy resin frame member 111 and the outer end surface 116b of the third electrically conductive porous body 116. Therefore, by increasing the surface size of the third electrically conductive porous body 116 and decreasing the distance L2, it is possible to improve the positional accuracy between the dummy resin frame member 111 and the dummy assembly 110.

Thus, in the fuel cell stack 10, it is possible to reliably join the resin frame member 82 and the dummy assembly 110 together without causing rattling to obtain each of the dummy cells. That is, it is possible to obtain each of the dummy cells having high quality at a high yield rate. Accordingly, it is possible to reduce the production cost of the fuel cell stack 10, and improve the power generation stability of the fuel cell stack 10.

Further, in the fuel cell stack 10, the inlet blocking part 122a and the outlet blocking part 122b are provided between the portion of the resin frame equipped dummy assembly 106 closer to the third electrically conductive porous body 116 in the stacking direction and each of the dummy second separator 108 and the dummy third separator 130. In this manner, as described above, since the second space 126 functions as heat insulating space, it is possible to improve the heat insulating performance in each of the dummy cells. Further, since the flow of the fuel gas to the second space 126 is blocked, it is possible to reduce the quantity of the fuel gas discharged from the fuel cell stack 10 without contributing to electrochemical reactions for power generation.

In particular, the oxygen-containing gas in the humidified state is supplied to the oxygen-containing gas supply passage 40 in the direction indicated by the arrow A1. If the water vapor in the oxygen-containing gas is condensed to produce condensed water in the liquid state and the condensed water is splashed into the power generation cells 12, diffusion performance of the reactant gases may be lowered undesirably.

In an attempt to address the problem, in the fuel cell stack 10, as described above, the connection channel 125 is provided between the first electrically conductive porous body 112 of the resin frame equipped dummy assembly 106 in the stacking direction and each of the dummy first separator 105 and the dummy second separator 108. In the structure, the oxygen-containing gas supplied to the oxygen-containing gas supply passage 40 of each dummy cell flows through the first space 109 via the connection channel 125. Therefore, even if the oxygen-containing gas contains the condensed water, the condensed water is collected by each of the dummy cells, and it is possible to prevent the condensed water from being splashed into the power generation cells 12.

The condensed water, etc. in the liquid state collected by each of the dummy cells is discharged smoothly from each of the dummy cells, during high load power generation of the fuel cell stack 10, or when power generation of the fuel cell stack 10 is stopped and the flow rate of the oxygen-containing gas flowing through the first space 109 is increased by the drying process, or when each of the dummy cells is dried.

In the dummy assembly 110, the water repellent treatment is applied to the third electrically conductive porous body 116 facing the second space 126 or the second electrically conductive porous body 114 adjacent to the third electrically conductive porous body 116. Therefore, in each of the dummy cells, it is possible to prevent entry of liquid water from the first space 109 from being flowing into the second space 126 where the flow of the fuel gas is blocked.

As a result, by the oxygen-containing gas flowing through the first space 109, it becomes possible to discharge the liquid water in each of the dummy cells more suitably. Accordingly, it is possible to suppress stagnation of the liquid water in each of the dummy cells. Therefore, even in the environment at low temperature, it is possible to avoid freezing of each of the dummy cells. As described above, in the fuel cell stack 10, it is possible to improve the power generation stability by each of the dummy cells where freezing is suppressed.

In the fuel cell stack 10, the dummy resin frame member 104 and the resin frame member 82 have the same structure. Therefore, the same structure can be adopted for the dummy resin frame member 104 and the resin frame member 82 of the power generation cell 12. Accordingly, each of the dummy cells can have more simple and economical structure.

In the fuel cell stack 10, the three electrically conductive porous bodies, i.e., the first electrically conductive porous body 112, the second electrically conductive porous body 114, and the third electrically conductive porous body 116 are made of the same material. Therefore, for example, unlike the dummy cell according to the comparative example where the metal plate is held by the electrically conductive porous body, in each of the dummy cells of the fuel cell stack 10 according to the embodiment of the present invention, it is possible to reduce the contact resistance in the dummy assembly 110. In the structure, since it is possible to reduce the internal resistance of the fuel cell stack 10, it is possible to increase the power generation efficiency. It should be noted that the three electrically conductive porous bodies (the first electrically conductive porous body 112, the second electrically conductive porous bodies 114, and the third electrically conductive porous bodies 116 may be made of different materials).

Unlike the power generation cell 12 where the outer portions of the resin frame member 82 and the membrane electrode assembly 80 are joined together tightly to suppress cross leakage, etc., in each of the dummy cells which does not perform power generation, there is no need to suppress cross leakage. Therefore, by forming the second joint part 120 where the dummy assembly 110 and the dummy resin frame member 104 are joined together discontinuously in the peripheral direction of the outer periphery of the dummy assembly 110 (third electrically conductive porous body 116), it becomes possible to simplify the step of joining the dummy assembly 110 and the dummy resin frame member 111, and obtain each of the dummy cells efficiently. Moreover, it becomes possible to improve the production efficiency of the fuel cell stack 10. It should be noted that the second joint part 120 may be formed around the dummy assembly 110.

In the embodiment of the present invention, in the second joint part 120, the resin projection 120*a* as the part of the resin frame member 82 includes the second resin impregnation portion 120*b* impregnated with the third electrically conductive porous body 116. Therefore, for example, unlike the dummy resin frame member 111 and the dummy assembly 110 that are joined together using adhesive only between the dummy resin frame member 111 and the dummy assembly 110, it is possible to improve the joining strength of the dummy resin frame member 111 and the dummy assembly 110.

As describe above, the second resin impregnation portion 120*b* is provided discontinuously in the peripheral direction in the outer exposed portion 116*a* of the third electrically conductive porous body 116. Therefore, unlike the case of providing the second resin impregnation portion 120*b* around the outer exposed portion 116*a* of the third electrically conductive porous body 116, it is possible to reduce the portion heated at the time of deforming (melting) the dummy resin frame member 111. As a result, it is possible to suppress occurrence of warpage, etc. of the dummy resin frame member 111 due to heating.

In the embodiment of the present invention, the second joint part 120 (second resin impregnation portion 120*b*) is provided in the outer marginal portion of the third electrically conductive porous body 116, and the second joint part 120 (second resin impregnation portion 120*b*) is not provided in the first electrically conductive porous body 112 or the second electrically conductive porous body 114. Also in this case, it is possible to simplify the joining step of joining the dummy resin frame member 111 and the dummy assembly 110, and suppress warpage, etc. of the dummy resin frame member 111 due to heating.

In the above embodiment, the resin projection 120*a* as part of the dummy resin frame member 111 is deformed by heating. In this manner, with simple structure, it is possible to form the second joint part 120 easily and suitably. Thus, it becomes possible to obtain each of the dummy cells more efficiently. Moreover, it is possible to improve the production efficiency of the fuel cell stack 10.

The present invention shall not be limited to the above described embodiments specially. Various modifications may be made without deviating from the gist of the present invention.

Figure 13:
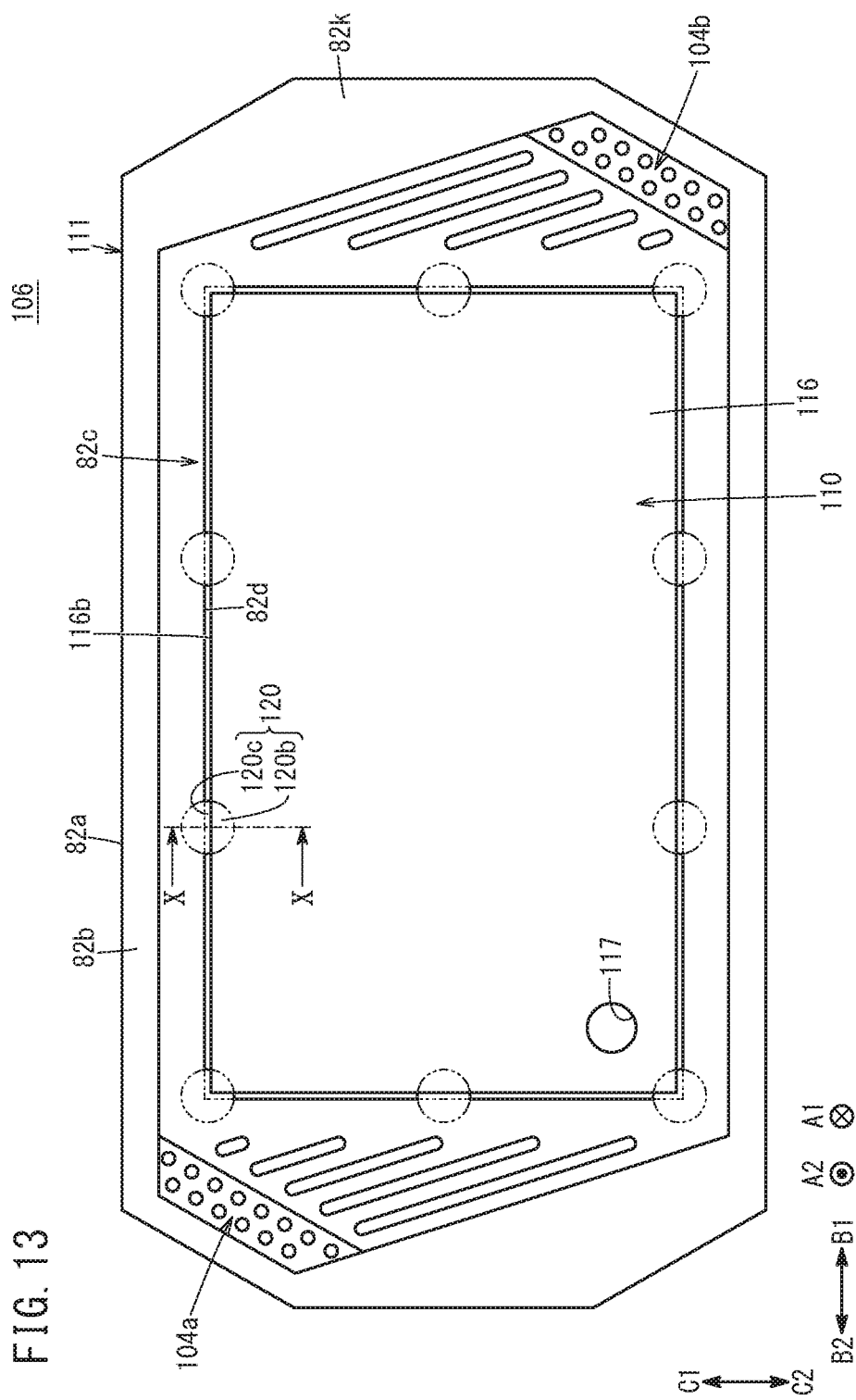
FIG. 13 is a front view showing a third electrically conductive porous body of a resin frame equipped dummy assembly according to a modified embodiment.
Figure 14:
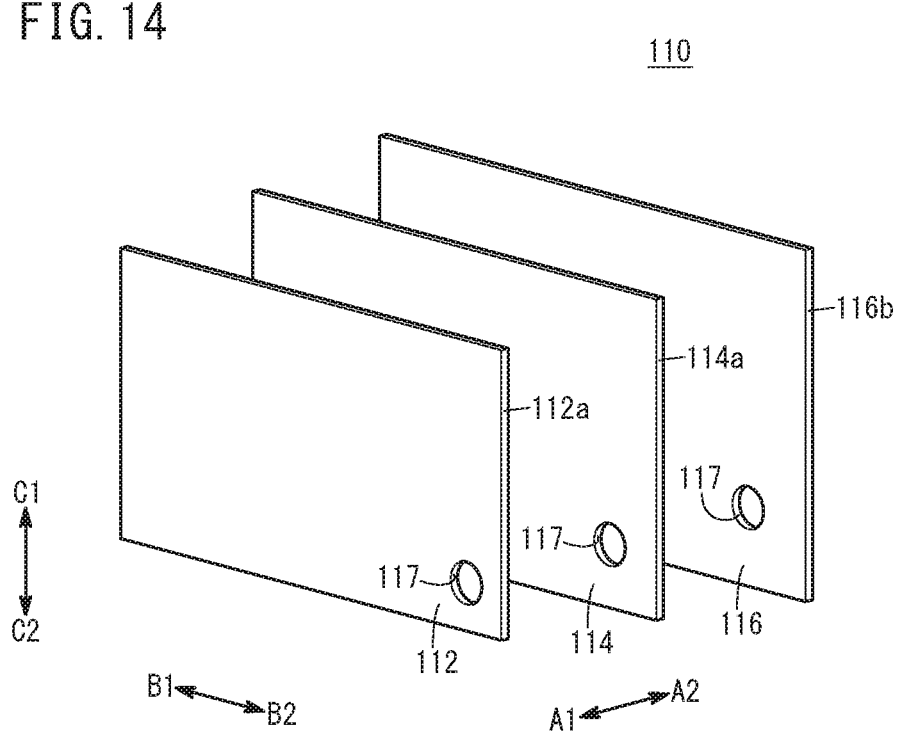
FIG. 14 is an exploded perspective view showing a dummy assembly of FIG. 13.

For example, as shown in FIGS. 13 and 14, at an end of the dummy assembly 110 in the direction indicated by the arrow B2, at the lower position in the vertical direction (indicated by the arrow C2) of the dummy assembly 110, a through hole 117 penetrating through the first electrically conductive porous body 112, the second electrically conductive porous body 114, and the third electrically conductive porous body 116 may be provided. In the examples of FIGS. 13 and 14, the cross section perpendicular to the axial direction of the through hole 117 has a circular shape. However, the present invention is not limited in this respect. Further, the through holes 117 formed respectively in the first electrically conductive porous body 112, the second electrically conductive porous body 114, and the third electrically conductive porous body 116 may have the same size, or may have different sizes.

The first space 109 of the dummy assembly 110 provided adjacent to the first electrically conductive porous body 112 and the second space 126 of the dummy assembly 110 provided adjacent to the third electrically conductive porous body 116 are connected by the through hole 117, at a position adjacent to the oxygen-containing gas discharge passage 46. That is, in each of the dummy cells, the first space 109 and the second space 126 on both sides of the dummy assembly 110 are connected by the through hole 117, at the position adjacent to the oxygen-containing gas discharge passage 46.

As described above, the through hole 117 is provided in the dummy assembly 110 to connect the first space 109 and the second space 126 at the lower position in the vertical direction. Therefore, even in the case where the liquid water enters the second space 126, the liquid water moves toward the through hole 117 by the gravity, and the liquid water is guided toward the first space 109 through the through hole 117.

As a result, by the oxygen-containing gas flowing through the first space 109, it becomes possible to facilitate water discharging from each of the dummy cells more suitably, and it is possible suppress stagnation of the liquid water inside each of the dummy cells. Therefore, even in the environment at low temperature, it is possible to avoid freezing of each of the dummy cells. As a result, by each of the dummy cells where freezing is suppressed, it is possible to improve the power generation stability of the fuel cell stack 10.

As described above, in the fuel cell stack 10, the through hole 117 of the dummy assembly 110 is provided adjacent to the oxygen-containing gas discharge passage 46. In the structure, it is possible to effectively discharge the liquid water guided from the second space 126 to the first space 109 through the through hole 117 to the outside of each of the dummy cells (oxygen-containing gas discharge passage 46).

As described above, in the fuel cell stack 10, each of the separators and each of the dummy separators have a rectangular shape having the longitudinal direction oriented in the horizontal direction. Further, the oxygen-containing gas supply passage 40 is provided in each of the separators and each of the dummy separators at the upper end in the vertical direction (indicated by the arrow C1), and the oxygen-containing gas discharge passage 46 is provided in each of the separator and the dummy separators at the lower position in the vertical direction (indicated by the arrow C2). In the structure, by effectively guiding the liquid water in each of the power generation cells 12 and each of the dummy cells to the oxygen-containing gas discharge passage 46 by the gravity, it is possible to suitably discharge water.

As described above, in the fuel cell stack 10, the oxygen-containing gas flows through the first space 109 in one direction oriented in the longitudinal direction of each of the dummy separators. In the structure, it becomes possible to easily guide the liquid water in each of the dummy cells toward the oxygen-containing gas discharge passage 46 easily through the first space 109, for discharging the water.

In the illustrated embodiment, in the dummy assembly 110, the one circular through hole 117 is formed adjacent to the oxygen-containing gas discharge passage 46 in a plan view. However, the present invention is not limited in this respect. The through hole 117 may be provided at any position below the dummy assembly 110 in the vertical direction. Further, the through hole 117 should have a shape which can connect the first space 109 and the second space 126. Further, a plurality of the through holes 117 may be provided in the dummy assembly 110.

In the above embodiment, water repellent treatment is applied to the third electrically conductive porous body 116 or the second electrically conductive porous body 114. In order to avoid entry of the liquid water to the second space 126 effectively, most preferably, water repellent treatment should be applied to the third electrically conductive porous body 116 which is close to the second space 126. Further, also in the case of applying water repellent treatment to the second electrically conductive porous body 114 adjacent to the third electrically conductive porous body 116, it is possible to effective suppress entry of liquid water into the second space 126. However, the present invention is not limited in this respect. Water repellent treatment may be applied to the first electrically conductive porous body 112.

In the fuel cell stack 10 according to the above embodiment, the first end power generation unit 16, the first dummy cell 18 and the second dummy cell 20 are stacked together on the side of the stack body 14 indicated by the arrow A1, and the second end power generation unit 22 and the third dummy cell 24 are stacked together on the side of the stack body 14 in the direction indicated the arrow A2.

As described above, the number of dummy cells provided on the side of the stack body 14 indicated by the arrow A1 i.e., on the inlet side of the oxygen-containing gas is large in comparison with the number of dummy cells provided on the side of the stack body 14 indicated by the arrow A2, i.e., on the outlet side of the oxygen-containing gas. In this manner it becomes possible to effectively suppress entry of the condensed water into the power generation cells 12. However, as long as the fuel cell stack 10 includes the dummy cell at least on one end side of the stack body 14 in the stacking direction, the number of the dummy cells is not limited specially.

Further, the first end power generation unit 16 or the second end power generation unit 22 is interposed between the power generation cell 12 and the first dummy cell 18 or the third dummy cell 24. In this manner, it is possible to cool the membrane electrode assemblies 80 in the first end power generation unit 16 and the second end power generation unit 22 which perform power generation at both ends of the stack body 14 in the stacking direction under the same conditions as the other membrane electrode assembly 80. As a result, it becomes possible to achieve the same balance between heat production and cooling over the entire stack body 14. Accordingly, it is possible to achieve further improvement in the power generation performance and the power generation stability.

However, the first end power generation unit 16 and the second end power generation unit 22 are not essential. The fuel cell stack 10 may include only one of the first end power generation unit 16 and the second end power generation unit 22, or the fuel cell stack 10 may include none of the first end power generation unit 16 and the second end power generation unit 22.

What is claimed is:

1. A fuel cell stack comprising:
a stack body comprising a plurality of power generation cells stacked together in a stacking direction, the power generation cells each including a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body;
a dummy cell provided at least at one end of the stack body in the stacking direction;
wherein the dummy cell includes a dummy assembly corresponding to the membrane electrode assembly, a dummy resin frame member provided around the dummy assembly, and dummy separators sandwiching the dummy assembly;
the dummy assembly is formed by stacking together three electrically conductive porous bodies each having a different surface size; and
the three electrically conductive porous bodies are stacked to form a stepped surface at an outer marginal portion of the dummy assembly, and the dummy resin frame member is joined to the stepped surface.

2. The fuel cell stack according to claim 1, wherein each of the separators and the dummy separators has an oxygen-containing gas passage configured to allow an oxygen-containing gas to flow in the stacking direction of the stack body and a fuel gas passage configured to allow a fuel gas to flow in the stacking direction of the stack body;
one separator of the separators that faces one of the electrodes of the membrane electrode assembly has an oxygen-containing gas flow field along which the oxygen-containing gas flows;

another separator of the separators that faces another of the electrodes of the membrane electrode assembly has a fuel gas flow field along which the fuel gas flows;

first space corresponding to the oxygen-containing gas flow field is formed between one dummy separator of the dummy separators that faces one end side of the dummy assembly in the stacking direction and the one end side of the dummy assembly;

second space corresponding to the fuel gas flow field is formed between another dummy separator of the dummy separators that faces another end side of the dummy assembly in the stacking direction and the other end side of the dummy assembly;

a connection channel configured to permit flow of the oxygen-containing gas is provided between the oxygen-containing gas passage and the first space; and a blocking part configured to block flow of the fuel gas is provided between the fuel gas passage and the second space.

3. The fuel cell stack according to claim 1, wherein the dummy resin frame member has a same structure as the resin frame member.

4. The fuel cell stack according to claim 1, wherein the three electrically conductive porous bodies are made of a same material.

5. The fuel cell stack according to claim 1, wherein a joint part configured to join the dummy assembly and the dummy resin frame member together is formed discontinuously in a peripheral direction of the dummy assembly.

6. The fuel cell stack according to claim 1, wherein the dummy assembly is formed by stacking the three electrically conductive porous bodies including a first electrically conductive porous body, a second electrically conductive porous body having a surface size larger than that of the first electrically conductive porous body, and a third electrically conductive porous body having a surface size larger than that of the second electrically conductive porous body; and the surface size of the third electrically conductive porous body is larger than a surface size of the gas diffusion layer.

7. The fuel cell stack according to claim 6, wherein the second electrically conductive porous body is provided at a center of the dummy assembly in the stacking direction;

the dummy resin frame member includes:

a contact surface configured to contact an outer exposed portion of the second electrically conductive porous body extending outward beyond an outer end surface of the first electrically conductive porous body; and a joint surface joined to an outer exposed portion of the third electrically conductive porous body extending outward beyond an outer end surface of the second electrically conductive porous body through a joint part, and wherein the joint part is formed discontinuously in a peripheral direction of the outer exposed portion of the third electrically conductive porous body.

8. The fuel cell stack according to claim 7, wherein the joint part includes an impregnation portion where the outer exposed portion of the third electrically conductive porous body is impregnated with part of the melted dummy resin frame member.

9. The fuel cell stack according to claim 8, wherein part of the dummy resin frame member is a resin projection provided on an outer side beyond the joint surface of the dummy resin frame member in a manner that the resin projection protrudes in a thickness direction of the resin frame member.

10. The fuel cell stack according to claim 1, wherein water repellent treatment is applied to one of the three electrically conductive porous bodies.

11. The fuel cell stack according to claim 10, wherein the dummy assembly is formed by stacking the three electrically conductive porous bodies including a first electrically conductive porous body, a second electrically conductive porous body stacked on the first electrically conductive porous body, and a third electrically conductive porous body stacked on the second electrically conductive porous body;

water repellent treatment is applied to one of the second electrically conductive porous body and the third electrically conductive porous body;

each of the separators and the dummy separators has an oxygen-containing gas passage configured to allow an oxygen-containing gas to flow in the stacking direction of the stack body and a fuel gas passage configured to allow a fuel gas to flow in the stacking direction of the stack body;

the separator that faces one of the electrodes of the membrane electrode assembly has an oxygen-containing gas flow field along which the oxygen-containing gas flows;

the separator that faces another of the electrodes of the membrane electrode assembly has a fuel gas flow field along which the fuel gas flows;

first space corresponding to the oxygen-containing gas flow field is formed between the dummy separator and the first electrically conductive porous body;

second space corresponding to the fuel gas flow field is formed between the dummy separator and the third electrically conductive porous body;

a connection channel configured to permit flow of the oxygen-containing gas is provided between the oxygen-containing gas passage and the first space; and a blocking part configured to block flow of the fuel gas is provided between the fuel gas passage and the second space.

12. The fuel cell stack according to claim 11, wherein a joint part configured to join the dummy assembly and the dummy resin frame member together is formed discontinuously in a peripheral direction of the electrically conductive porous body having a largest surface size, among the three electrically conductive porous bodies.

13. The fuel cell stack according to claim 1, wherein each of the separators and the dummy separators has an oxygen-containing gas passage configured to allow an oxygen-containing gas to flow in the stacking direction of the stack body and a fuel gas passage configured to allow a fuel gas to flow in the stacking direction of the stack body;

one separator of the separators that faces one of the electrodes of the membrane electrode assembly has an oxygen-containing gas flow field along which the oxygen-containing gas flows;

another separator of the separators that faces another of the electrodes of the membrane electrode assembly has a fuel gas flow field along which the fuel gas flows;

first space corresponding to the oxygen-containing gas flow field is formed between one dummy separator of the dummy separators that faces one end side of the dummy assembly in the stacking direction and the one end side of the dummy assembly;

second space corresponding to the fuel gas flow field is formed between another dummy separator of the dummy separators that faces another end side of the dummy assembly in the stacking direction and the other end side of the dummy assembly;

a connection channel configured to permit flow of the oxygen-containing gas is provided between the oxygen-containing gas passage and the first space; and the dummy assembly has a through hole connecting the first space and the second space at a lower position in a vertical direction.

14. The fuel cell stack according to claim 13, wherein the through hole of the dummy assembly is provided adjacent to the oxygen-containing gas passage on an outlet side of the oxygen-containing gas which flows through the first space.

15. The fuel cell stack according to claim 13, wherein the separators and the dummy separators have a rectangular shape, and a longitudinal direction of the rectangular shape is oriented in a horizontal direction;

the oxygen-containing gas passage on an inlet side configured to supply the oxygen-containing gas to the oxygen-containing gas flow field and the first space is provided at an upper position in the vertical direction of the separators and the dummy separators; and the oxygen-containing gas passage on an outlet side configured to discharge the oxygen-containing gas from the oxygen-containing gas flow field and the first space is provided at a lower position in the vertical direction of the separators and the dummy separators.

16. The fuel cell stack according to claim 13, wherein the first space is configured to allow the oxygen-containing gas to flow in one direction oriented in a longitudinal direction of the dummy separators.

17. The fuel cell stack according to claim 1, wherein the three electrically conductive porous bodies include a first electrically conductive porous body, a second electrically conductive porous body having a surface size larger than that of the first electrically conductive porous body, and a third electrically conductive porous body having a surface size larger than that of the second electrically conductive porous body; and the dummy resin frame member includes an outer marginal portion, a shelf protruding inward from an inner end of the outer marginal portion over an entire periphery through a first stepped surface, and a thin portion protruding inward from an inner end of the shelf over an entire periphery through a second stepped surface;

an outer marginal portion of the third electrically conductive porous body is overlapped with the shelf of the dummy resin frame member; and an outer marginal portion of the second electrically conductive porous body is adjacent to the thin portion of the dummy resin frame member; and an outer end surface of the first electrically conductive porous body faces an inner end surface of the dummy resin frame member.

18. The fuel cell stack according to claim 17, wherein a thickness of the second electrically conductive porous body is larger than a height of the second stepped surface.

19. The fuel cell stack according to claim 17, wherein space is formed between the thin portion of the dummy resin frame member and the third electrically conductive porous body.

20. A dummy cell of a fuel cell stack, the fuel cell stack comprising:

a stack body comprising a plurality of power generation cells stacked together in a stacking direction, the power generation cells each including a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body;

the dummy cell being provided at least at one end of the stack body in the stacking direction;

wherein the dummy cell includes a dummy assembly corresponding to the membrane electrode assembly, a dummy resin frame member provided around the dummy assembly, and dummy separators sandwiching the dummy assembly;

the dummy assembly is formed by stacking three electrically conductive porous bodies each having a different surface size; and the three electrically conductive porous bodies are stack to form a stepped surface at an outer marginal portion of the dummy assembly, and the dummy resin frame member is joined to the stepped surface.

21. A method of producing a dummy cell provided at least at one end of a stack body of a fuel cell stack in a stacking direction;

the fuel cell stack comprising:

the stack body comprising a plurality of power generation cells stacked together in the stacking direction, the power generation cells each including a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body;

the method comprising:

a water repellent treatment step of applying water repellent treatment to one of three electrically conductive porous bodies each having a different surface size;

a first stacking step of stacking the three electrically conductive porous bodies together to form a dummy assembly corresponding to the membrane electrode assembly;

a resin frame joining step of providing the dummy assembly with a dummy resin frame member extending around the dummy assembly to thereby obtain a resin frame equipped dummy assembly; and a second stacking step of sandwiching the resin frame equipped dummy assembly between dummy separators to obtain the dummy cell, wherein in the first stacking step, the three electrically conductive porous bodies are stacked to form a stepped surface at an outer marginal portion of the dummy assembly, and wherein in the resin frame joining step, the dummy resin frame is joined to the stepped surface.

* * * * *